(12) United States Patent
Yamaguchi et al.

(10) Patent No.: US 9,765,686 B2
(45) Date of Patent: Sep. 19, 2017

(54) VALVE DRIVE APPARATUS AND SUPERCHARGER HAVING THE SAME

(71) Applicant: DENSO CORPORATION, Kariya, Aichi-pref. (JP)

(72) Inventors: Masashi Yamaguchi, Kariya (JP); Etsugo Yanagida, Kariya (JP); Tetsuji Yamanaka, Obu (JP)

(73) Assignee: DENSO CORPORATION, Kariya (JP)

( * ) Notice: Subject to any disclaimer, the term of this patent is extended or adjusted under 35 U.S.C. 154(b) by 506 days.

(21) Appl. No.: 14/263,463

(22) Filed: Apr. 28, 2014

(65) Prior Publication Data

US 2014/0322046 A1 Oct. 30, 2014

(30) Foreign Application Priority Data

Apr. 30, 2013 (JP) .................................. 2013-95433
Apr. 30, 2013 (JP) .................................. 2013-95434
Mar. 3, 2014 (JP) .................................. 2014-40374

(51) Int. Cl.
| | | |
|---|---|---|
| F02B 37/18 | (2006.01) | |
| F02B 37/00 | (2006.01) | |
| F02B 37/007 | (2006.01) | |
| F02B 37/02 | (2006.01) | |

(52) U.S. Cl.
CPC .......... *F02B 37/186* (2013.01); *F02B 37/001* (2013.01); *F02B 37/007* (2013.01); *F02B 37/025* (2013.01); *Y02T 10/144* (2013.01)

(58) Field of Classification Search
CPC ...... F02B 37/18; F02B 37/183; F02B 37/186; F02B 37/026; F02B 37/007; F02B 37/16; F02B 37/162; F04D 17/17; F04D 17/122; F04D 27/0215

USPC ........ 74/469; 137/628, 63.016, 630.17, 637; 60/602

See application file for complete search history.

(56) References Cited

U.S. PATENT DOCUMENTS

| | | | | |
|---|---|---|---|---|
| 2011/0023481 | A1* | 2/2011 | Baeuerle | F01D 17/105 60/602 |
| 2012/0060494 | A1* | 3/2012 | Sato | F02B 37/025 60/602 |

FOREIGN PATENT DOCUMENTS

| | | |
|---|---|---|
| JP | 10-89081 | 4/1998 |
| JP | 2010-281271 | 12/2010 |
| JP | 2010281271 A * | 12/2010 |

(Continued)

OTHER PUBLICATIONS

Yamanaka, et al., U.S. Appl. No. 14/263,268, filed Apr. 28, 2014.

*Primary Examiner* — Charles Freay
*Assistant Examiner* — Kenneth J Hansen
(74) *Attorney, Agent, or Firm* — Nixon & Vanderhye P.C.

(57) ABSTRACT

In a valve drive apparatus, which drives a first valve and a second valve of a supercharger, a first rod is rotatably connected to a first valve lever shaft at one end part thereof to drive the first valve and is connected to a shaft at the other end part thereof, and a second rod is rotatably connected to a second valve lever shaft at one end part thereof to drive the second valve and is connected to a second member at the other end part thereof. A spring is placed between a first engaging part of the first member and a second engaging part of the second member and urges the first member and the second member to urge a first contact part of the first member and a second contact part of the second member toward each other.

12 Claims, 25 Drawing Sheets

(56) References Cited

FOREIGN PATENT DOCUMENTS

WO    WO 2007002520 A1 *  1/2007  ........... F01D 17/105

* cited by examiner

VALVE DRIVE APPARATUS AND SUPERCHARGER HAVING THE SAME

CROSS REFERENCE TO RELATED APPLICATION

This application is based on and incorporates herein by reference Japanese Patent Application No. 2013-95433 filed on Apr. 30, 2013, Japanese Patent Application No. 2013-95434 filed on Apr. 30, 2013, and Japanese Patent Application No. 2014-40374 filed on Mar. 3, 2014.

TECHNICAL FIELD

The present disclosure relates to a valve drive apparatus and a supercharger having the same.

BACKGROUND

Previously, a valve drive apparatus, which drives two valves of a supercharger, has been known. For example, JP2010-281271A discloses a valve drive apparatus, which has a single actuator that drives two valves (first and second valves) of a two-stage supercharger. This valve drive apparatus includes a link mechanism placed between the actuator and the valves. A drive force of the actuator is transmitted to the valves through the link mechanism.

In the valve drive apparatus of JP2010-281271A, the second valve is urged in a closing direction thereof by a spring and is thereby held in a valve closed state until the first valve is opened to a predetermined opening degree or larger. When the first valve opens to the predetermined opening degree or larger, the second valve is opened by the link mechanism synchronously with the first valve. When the second valve is opened synchronously with the first valve, the urging force of the spring is applied to the first valve and the second valve. In the valve drive apparatus of JP2010-281271A, the link mechanism is formed with a large number of constituent members and is thereby complicated. Thus, the costs of the constituent members of the valve drive apparatus and manufacturing costs of the valve drive apparatus may be disadvantageously increased.

Furthermore, depending on an action angle of a link node of the link mechanism, a transmission efficiency of the drive force of the actuator may possibly be deteriorated. JP2010-281271A does not disclose a structure, which improves the transmission efficiency of the drive force.

When the second valve is opened, the urging force of the spring is applied to an output shaft of the actuator through the link mechanism. Therefore, in a case where the second valve is mainly opened as the operation of the internal combustion engine, the load of the actuator is increased, and thereby the stress on the actuator may possibly be increased. Furthermore, in a case where the actuator is an electric actuator, electric power consumption may possibly be increased.

Furthermore, in the range, which is from the starting of the opening of the first vale to the starting of the opening of the second valve, i.e., the range, in which the first valve can be opened without receiving the urging force of the spring, is determined by a gap between the first member and the second member. A size of the gap between the first member and the second member may vary depending on variations of the constituent members, and thereby it may be difficult to accurately set the above-described range.

SUMMARY

The present disclosure is made in view of the above disadvantages.

According to the present disclosure, there is provided a valve drive apparatus installed to a supercharger that includes a first valve, which is rotatable about an axis of a first valve shaft, and a second valve, which is rotatable about an axis of a second valve shaft. The valve drive apparatus is configured to drive the first valve and the second valve. The valve drive apparatus includes an actuator, a shaft, a first member, a second member, a first valve lever, a second valve lever, a first rod, a second rod, and an urging device. The actuator includes an output shaft, which is movable in an axial direction of the output shaft. The shaft is formed coaxially and integrally with the output shaft or is formed separately from the output shaft. The first member is placed along an axis of the shaft and includes a first contact part and a first engaging part. The second member is placed along the axis of the shaft and includes a second contact part and a second engaging part. The second contact part is contactable with the first contact part. The first valve lever includes a first valve lever shaft, which is rotatable integrally with the first valve shaft. An axis of the first valve lever shaft is parallel to the axis of the first valve shaft and is placed at a location that is spaced from the axis of the first valve shaft by a first predetermined distance. The second valve lever includes a second valve lever shaft, which is rotatable integrally with the second valve shaft. An axis of the second valve lever shaft is parallel to the axis of the second valve shaft and is placed at a location that is spaced from the axis of the second valve shaft by a second predetermined distance. The first rod is rotatably connected to the first valve lever shaft at one end part of the first rod and is connected to the shaft or the first member at another end part of the first rod, which is opposite from the one end part of the first rod. The second rod is rotatably connected to the second valve lever shaft at one end part of the second rod and is connected to the second member at another end part of the second rod, which is opposite from the one end part of the second rod. The urging device is placed between the first engaging part and the second engaging part and urges the first member and the second member to urge the first contact part and the second contact part toward each other.

According to the present disclosure, there is also provided a valve drive apparatus installed to a supercharger that includes a first valve, which is rotatable about an axis of a first valve shaft, and a second valve, which is rotatable about an axis of a second valve shaft. The valve drive apparatus is configured to drive the first valve and the second valve. The valve drive apparatus includes an actuator, a first drive lever, a second drive lever, a first valve lever, a second valve lever, a first rod, a second rod, a first predetermined shape portion, a second predetermined shape portion, and an urging device. The actuator includes an output shaft, which is rotatable about an axis of the output shaft. The first drive lever includes a first drive lever shaft, which is rotatable integrally with the output shaft. An axis of the first drive lever shaft is parallel to the axis of the output shaft and is placed at a location that is spaced from the axis of the output shaft by a first predetermined distance. The second drive lever includes a second drive lever shaft, which is rotatable relative to the output shaft. An axis of the second drive lever shaft is parallel to the axis of the output shaft and is placed at a location, which is spaced from the axis of the output shaft by a second predetermined distance. The first valve lever includes a first valve lever shaft, which is rotatable integrally with the first valve shaft. An axis of the first valve lever shaft is parallel to the axis of the first valve shaft and is placed at a location, which is spaced from the axis of the first valve shaft by a third predetermined distance. The second valve lever includes a second valve lever shaft, which is rotatable integrally with the second valve shaft. An axis of the second valve lever shaft is parallel to the axis of the second valve shaft and is placed at a location, which is spaced from the axis of the second valve shaft by a fourth predetermined distance. The first rod that is rotatably connected to the first drive lever shaft at one end part of the first rod and is rotatably connected to the first valve lever shaft at another end part of the first rod, which is opposite from the one end part of the first rod. The second rod is rotatably connected to the second drive lever shaft at one end part of the second rod and is rotatably connected to the second valve lever shaft at another end part of the second rod, which is opposite from the one end part of the second rod. The first predetermined shape portion is formed at a corresponding location of the first drive lever, which is spaced from the axis of the output shaft by a predetermined distance. The second predetermined shape portion is formed in the second drive lever and is contactable with the first predetermined shape portion. The urging device is placed between the first drive lever and the second drive lever and urges the first drive lever and the second drive lever to move the first predetermined shape portion and the second predetermined shape portion toward each other.

According to the present disclosure, there is also provided a supercharger, which includes a compressor, a turbine, a first valve, a second valve and one of the above-described valve drive apparatuses. The compressor is installed in an intake passage, which guides intake air to an internal combustion engine. The turbine is installed in an exhaust passage, which conducts exhaust gas outputted from the internal combustion engine. The turbine rotates the compressor when the turbine is rotated upon supply of the exhaust gas to the turbine. The first valve is installed in an exhaust flow path, which guides the exhaust gas from the internal combustion engine to the turbine. The first valve opens or closes the exhaust flow path through rotation of the first valve about an axis of a first valve shaft. The second valve is installed in a bypass flow path that connects between one side of the turbine, at which the internal combustion engine is located, and an opposite side of the turbine, which is opposite from the internal combustion engine, in the exhaust passage, while the bypass flow path bypasses the turbine. The second valve opens or closes the bypass flow path through rotation of the second valve about an axis of a second valve shaft. The first valve lever is rotatable integrally with the first valve shaft to drive the first valve, and the second valve lever is rotatable integrally with the second valve shaft to drive the second valve.

According to the present disclosure, there is also provided a supercharger, which includes a first compressor, a second compressor, a first turbine, a second turbine, a first valve, a second valve, and one of the above-described valve drive apparatuses. The first compressor and the second compressor are installed in an intake passage, which guides intake air to an internal combustion engine. The first turbine is installed in an exhaust passage, which conducts exhaust gas outputted from the internal combustion engine. The first turbine rotates the first compressor when the first turbine is rotated upon supply of the exhaust gas to the first turbine. The second turbine is installed in the exhaust passage. The second turbine rotates the second compressor when the second turbine is rotated upon supply of the exhaust gas to the second turbine. The first valve is installed in one of a first exhaust flow path, which guides the exhaust gas from the internal combustion engine to the first turbine, and a second exhaust flow path, which guides the exhaust gas from the internal combustion engine to the second turbine. The first valve opens or closes the one of the first exhaust flow path and the second exhaust flow path through rotation of the first valve about an axis of a first valve shaft. The second valve is installed in a bypass flow path that connects between one side of the first turbine and the second turbine, at which the internal combustion engine is located, and an opposite side of the first turbine and the second turbine, which is opposite from the internal combustion engine, in the exhaust passage, while the bypass flow path bypasses the first turbine and the second turbine. The second valve opens or closes the bypass flow path through rotation of the second valve about an axis of a second valve shaft. The first valve lever is rotatable integrally with the first valve shaft to drive the first valve, and the second valve lever is rotatable integrally with the second valve shaft to drive the second valve.

BRIEF DESCRIPTION OF THE DRAWINGS

The drawings described herein are for illustration purposes only and are not intended to limit the scope of the present disclosure in any way.

DETAILED DESCRIPTION

Figure 1A:
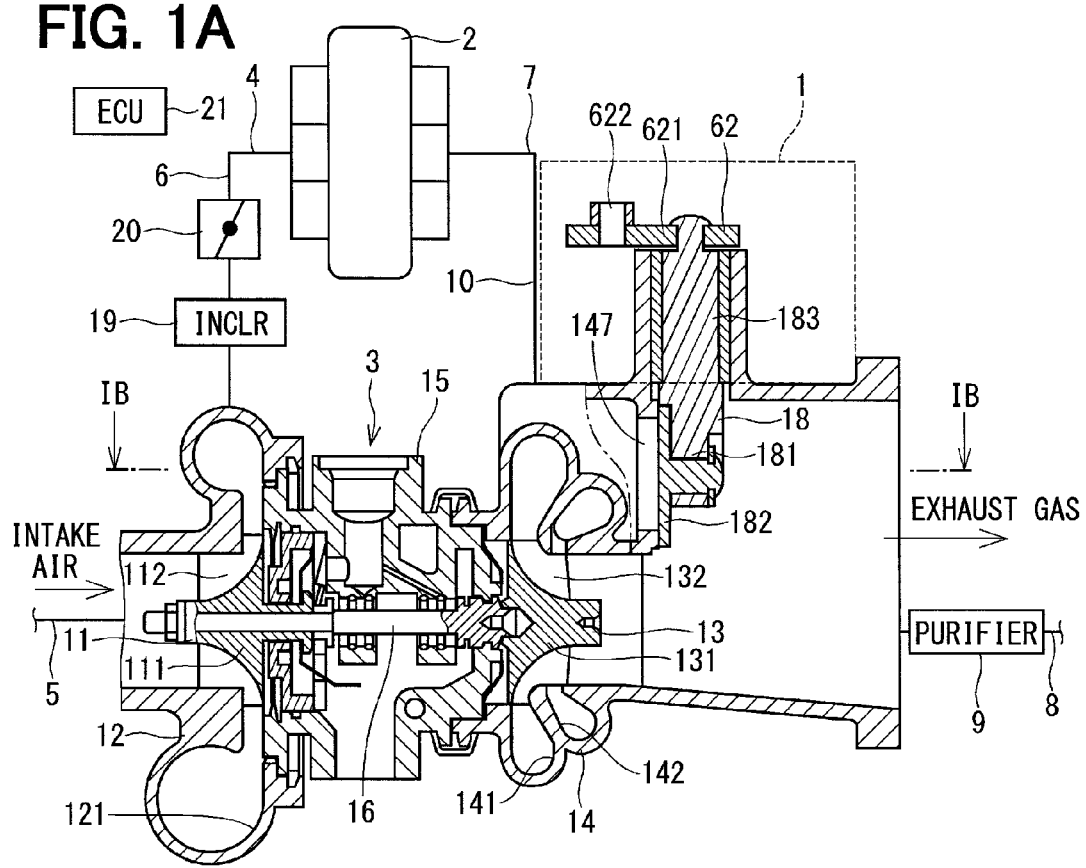
FIG. 1A is a cross-sectional view of a valve drive apparatus and a supercharger according to a first embodiment of the present disclosure.

Various embodiments of the present disclosure will be described with reference to the accompanying drawings. In the following embodiments, similar components will be indicated by the same reference numerals and will not be described redundantly for the sake of simplicity.

First Embodiment

FIGS. 1A to 7 show a valve drive apparatus according to a first embodiment of the present disclosure.

As shown in FIG. 1A, the valve drive apparatus 1 is installed to, for example, a supercharger 3, which supercharges intake air to an internal combustion engine (hereinafter referred to as an engine) 2 of a vehicle. The supercharger 3 supercharges the intake air to the engine 2 for the purpose of increasing an output of the engine 2, increasing a torque in a practical rotational speed range of the engine 2, and improving fuel consumption.

An intake conduit 4 is connected to the engine 2. An intake conduit 5 is provided on a side of the intake conduit 4, which is opposite from the engine 2. An intake opening (not shown), which is opened to the atmosphere, is formed in an end part of the intake conduit 5, which is opposite from the intake conduit 4. An intake passage 6 is formed in an inside of the intake conduit 4 and an inside of the intake conduit 5. The intake passage 6 guides the air (hereinafter referred to as intake air), which is drawn from the intake opening, to the engine 2.

An exhaust conduit 7 is connected to the engine 2. An exhaust conduit 8 is communicated to the atmosphere through an exhaust emission purifier 9 and an exhaust opening of the exhaust conduit 8. The exhaust emission purifier 9 includes a catalyst (not shown). An exhaust passage 10 is formed in an inside of the exhaust conduit 7 and an inside of the exhaust conduit 8. The exhaust passage 10 conducts the exhaust gas, which contains combustion gas generated during the operation of the engine 2. The exhaust gas is purified through the exhaust emission purifier 9 and is released to the atmosphere through the exhaust opening.

The supercharger 3 includes a compressor 11, a compressor housing 12, a turbine 13, a turbine housing 14, a bearing 15, a shaft 16, a first valve 17, and a second valve 18.

The compressor 11 is made of metal (e.g., aluminum) and is placed between the intake conduit 4 and the intake conduit 5 in the intake passage 6. The compressor 11 includes a tubular portion 111 and a plurality of blades 112. The tubular portion 111 is configured into a tubular form, which has an increasing outer diameter that increases from one end part to the other end part of the tubular portion 111. Each blade 112 is configured into a curved plate form. The blade 112 is formed in an outer wall of the tubular portion 111 and extends from the one end part of the tubular portion 111 to the other end part of the tubular portion 111. The blades 112 are arranged one after another at generally equal intervals in a circumferential direction of the tubular portion 111. The compressor 11 is received in the compressor housing 12.

The compressor housing 12 is placed between the intake conduit 4 and the intake conduit 5. The compressor housing 12 is made of, for example, metal. The compressor housing 12 includes a scroll 121. The scroll 121 is configured into an annular form (a ring form), which is placed on a radially outer side of the blades 112 of the compressor 11 and extends in a circumferential direction around the blades 112. Thereby, the intake air is guided from the intake conduit 5 to the intake conduit 4 through the compressor 11 and the scroll 121 located in the inside of the compressor housing 12.

The turbine 13 is made of, for example, nickel base heat resisting steel and is placed between the exhaust conduit 7 and the exhaust conduit 8 in the exhaust passage 10. The turbine 13 includes a tubular portion 131 and a plurality of blades 132. The tubular portion 131 is configured into a tubular form, which has an increasing outer diameter that increases from one end part to the other end part of the tubular portion 131. Each blade 132 is configured into a curved plate form. The blade 132 is formed in an outer wall of the tubular portion 131 and extends from the one end part of the tubular portion 131 to the other end part of the tubular portion 131. The blades 132 are arranged one after another at generally equal intervals in a circumferential direction of the tubular portion 131. The turbine 13 is received in the turbine housing 14.

The turbine housing 14 is placed between the exhaust conduit 7 and the exhaust conduit 8. The turbine housing 14 is made of metal (e.g., iron metal, which contains nickel). The turbine housing 14 includes a first scroll 141 and a second scroll 142. The first scroll 141 is configured into an annular form (a ring form), which is placed on a radially outer side of the blades 132 and extends in a circumferential direction around the blades 132. Similarly, the second scroll 142 is configured into an annular form (a ring form), which is placed on the radially outer side of the blades 132 and extends in the circumferential direction around the blades 132. The second scroll 142 is formed on an axial side of the first scroll 141 where the one end part of the tubular portion 131 is located.

Figure 1B:
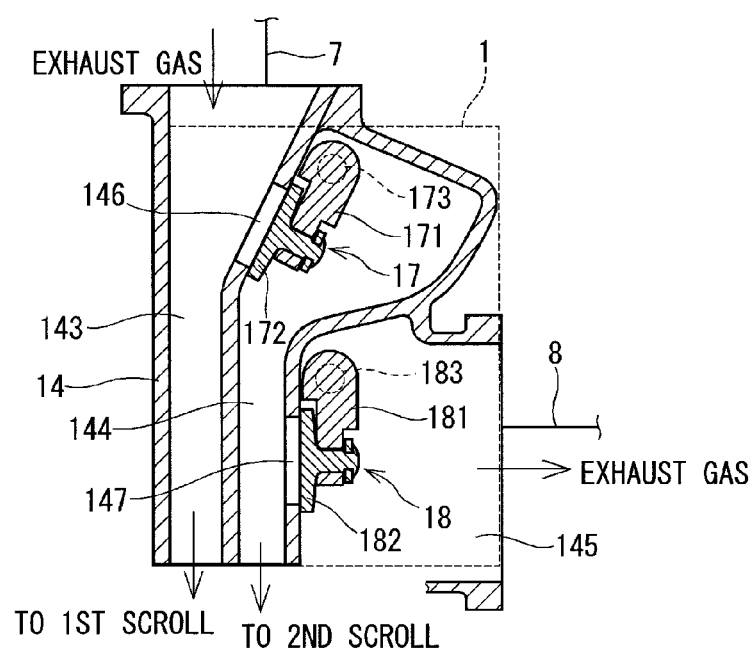
FIG. 1B is a cross-sectional view taken along line IB-IB in FIG. 1A.

As shown in FIG. 1B, a first flow path 143, a second flow path 144, and a third flow path 145 are formed in the turbine housing 14. The first flow path 143 connects between the inside of the exhaust conduit 7 and the first scroll 141. The second flow path 144 extends along the first flow path 143 and has one end part connected to the second scroll 142. An opening 146 is formed in a partition wall, which partitions between the first flow path 143 and the second flow path 144. Therefore, the other end part of the second flow path 144 is connected to the inside of the exhaust conduit 7 through the opening 146 and the first flow path 143.

The third flow path 145 connects the first scroll 141 and the second scroll 142 to the inside of the exhaust conduit 8 and extends along the second flow path 144. The turbine 13 is placed in the third flow path 145 at a corresponding location, which is adjacent to the first scroll 141 and the second scroll 142. An opening 147 is formed in a partition wall, which partitions between the second flow path 144 and the third flow path 145. Thereby, the second flow path 144 is connected to the third flow path 145 through the opening 147 while bypassing the turbine 13.

With the above-described construction, the exhaust gas, which is outputted from the engine 2, can flow to the exhaust conduit 8 through the inside of the exhaust conduit 7, the first flow path 143, the first scroll 141, the turbine 13, and the third flow path 145. Furthermore, the exhaust gas, which is outputted from the engine 2, can flow to the exhaust conduit 8 through the inside of the exhaust conduit 7, the first flow path 143, the opening 146, the second flow path 144, the second scroll 142, the turbine 13, and the third flow path 145. Here, the first flow path 143, the opening 146, the second flow path 144, and the second scroll 142 serve as an exhaust flow path of the present disclosure. Furthermore, the exhaust gas, which is outputted from the engine 2, can flow to the exhaust conduit 8 through the inside of the exhaust conduit 7, the first flow path 143, the opening 146, the second flow path 144, the opening 147, and the third flow path 145. Here, the second flow path 144, the opening 147, and the third flow path 145 serve as a bypass flow path of the present disclosure, which connects in the exhaust passage 10 between one side (upstream side) of the turbine 13, at which the engine 2 is located, and an opposite side (downstream side) of the turbine 13, which is opposite from the engine 2, while the bypass flow path bypasses the turbine 13.

Figure 2:
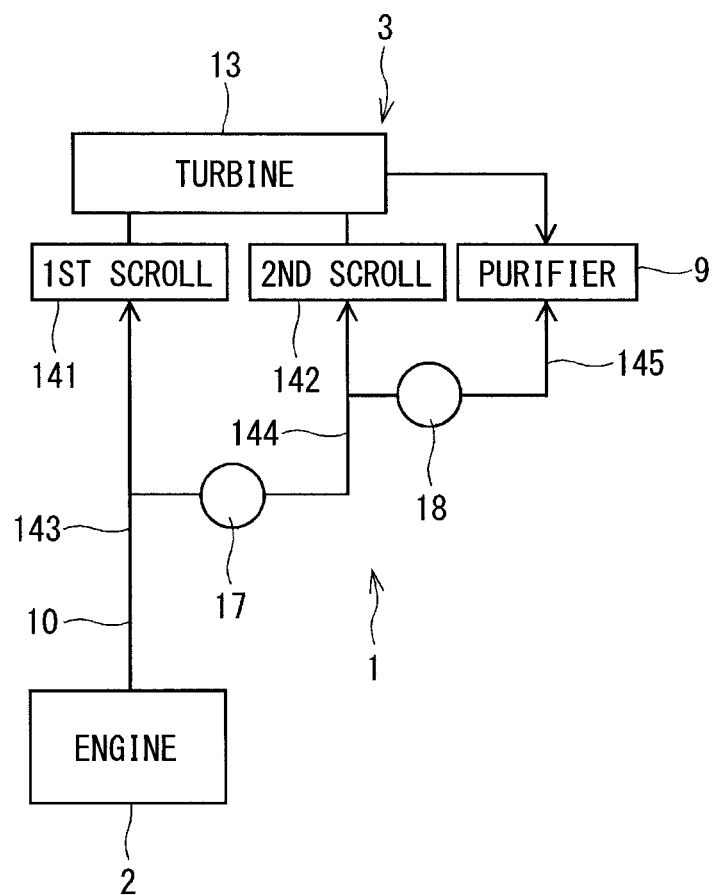
FIG. 2 is a schematic diagram showing the supercharger, to which the valve drive apparatus of the first embodiment is installed.

FIG. 2 schematically shows the structure of the supercharger 3.

The bearing 15 is made of, for example, metal and is placed between the compressor housing 12 and the turbine housing 14. The shaft 16 is made of, for example, metal and is configured into a rod form. The shaft 16 coaxially connects between the tubular portion 111 and the tubular portion 131. The shaft 16 is rotatably supported by the bearing 15. Thereby, the compressor 11 and the turbine 13 can rotate integrally with the shaft 16.

When the exhaust gas, which is outputted from the first scroll 141, and the exhaust gas, which is outputted from the second scroll 142, collides against the blades 132 of the turbine 13, the turbine 13 is rotated. Thereby, the compressor 11 is rotated, so that the intake air, which is present in the intake conduit 5, is compressed and is guided to the engine 2. In the present embodiment, an intercooler 19 is placed in the intake passage 6 between the compressor housing 12 and the engine 2. The intercooler 19 cools the intake air, the temperature of which is increased upon compression through the compressor 11. Thus, the density of the intake air is increased, and thereby the larger amount of intake air can be supplied to the engine 2.

In the present embodiment, a throttle valve 20 is placed in the intake passage 6 between the intercooler 19 and the engine 2. The throttle valve 20 can open and close the intake passage 6. An electronic control unit (hereinafter referred to as an ECU) 21 is connected to the throttle valve 20. The ECU 21 is a small computer, which includes a processor, a storage device(s) and an input/output device. The ECU 21 runs a program stored in the storage device to execute various computations based on signals received from sensors installed in corresponding components of the vehicle to control corresponding devices of the vehicle, so that the ECU 21 controls the entire vehicle. The ECU 21 controls the operation (the opening degree) of the throttle valve 20 to adjust the amount of intake air supplied to the engine 2.

The first valve 17 is made of, for example, metal and is placed at a location that is adjacent to the opening 146 of the second flow path 144. The first valve includes an arm 171, a valve element 172 and a first valve shaft 173. The arm 171 is configured into a rod form. The valve element 172 is provided at one end part of the arm 171. The first valve shaft 173 is configured into a cylindrical tubular form and is integrated with the arm 171 such that one end part of the first valve shaft 173 is connected to the other end part of the arm 171. The first valve shaft 173 is installed to the turbine housing 14 such that the other end part of the first valve shaft 173 is exposed to the outside of the turbine housing 14, and the first valve shaft 173 is rotatable about an axis of the first valve shaft 173. In this way, when the first valve shaft 173 is rotated about the axis of the first valve shaft 173, the valve element 172 is moved toward or away from the opening 146. When the valve element 172 contacts a peripheral edge part of the opening 146, the exhaust flow path is held in a closed state (a fully closed state, a valve closed state). In contrast, when the valve element 172 is moved away from the peripheral edge part of the opening 146, the exhaust flow path is placed in an open state (a valve open state).

In the valve closed state of the first valve 17, the exhaust gas is guided to the turbine 13 through the first flow path 143 and the first scroll 141 to rotate the turbine 13. In contrast, in the valve open state of the first valve 17, the exhaust gas is guided to the turbine 13 through the first flow path 143, the opening 146, the second flow path 144, the first scroll 141, and the second scroll 142 to rotate the turbine 13. As discussed above, the first valve 17 functions as a change valve and controls the amount of exhaust gas supplied to the turbine 13. Therefore, in the present embodiment, the supercharger 3 is a variable displacement supercharger.

The second valve 18 is made of, for example, metal and is placed at a location that is adjacent to the opening 147 of the third flow path 145. The second valve 18 includes an arm 181, a valve element 182 and a second valve shaft 183. The arm 181 is configured into a rod form. The valve element 182 is provided at one end part of the arm 181. The second valve shaft 183 is configured into a generally cylindrical tubular form and is integrated with the arm 181 such that one end part of the second valve shaft 183 is connected to the other end part of the arm 181. The second valve shaft 183 is installed to the turbine housing 14 such that the other end part of the second valve shaft 183 is exposed to the outside of the turbine housing 14, and the second valve shaft 183 is rotatable about an axis of the second valve shaft 183. In this way, when the second valve shaft 183 is rotated about the axis of the second valve shaft 183, the valve element 182 is moved toward or away from the opening 147. When the valve element 182 contacts a peripheral edge part of the opening 147, the bypass flow path is held in a closed state (a fully closed state, a valve closed state). In contrast, when the valve element 182 is moved away from the peripheral edge part of the opening 147, the bypass flow path is placed in an open state (a valve open state).

The moving direction of the valve element 172 of the first valve 17 away from the peripheral edge part of the opening 146 will be hereinafter also referred to as a valve opening direction of the first valve 17. Also, the moving direction of the valve element 182 of the second valve 18 away from the peripheral edge part of the opening 147 will be hereinafter also referred to as a valve opening direction of the second valve 18. Furthermore, the moving direction of the valve element 172 of the first valve 17 toward the peripheral edge part of the opening 146 will be hereinafter also referred to as a valve closing direction of the first valve 17. Also, the moving direction of the valve element 182 of the second valve 18 toward the peripheral edge part of the opening 147 will be hereinafter also referred to as a valve closing direction of the second valve 18.

In the state where the first valve 17 is in the valve open state, and the second valve 18 is in the valve closed sate, the exhaust gas is guided to the turbine 13 through the first flow path 143, the opening 146, the second flow path 144, the first scroll 141, and the second scroll 142 to rotate the turbine 13. In contrast, in the state where the first valve 17 and the second valve 18 are both in the open state, a portion of the exhaust gas in the second flow path 144 is conducted to the third flow path 145 through the opening 147. Therefore, the rotational speed of the turbine 13 is reduced, and thereby the supercharging pressure is reduced. In this way, it is possible to limit the excessive increase of the supercharging pressure. As discussed above, the second valve 18 functions as a waste gate valve and controls the amount of exhaust gas, which bypasses the turbine 13.

Figure 3:
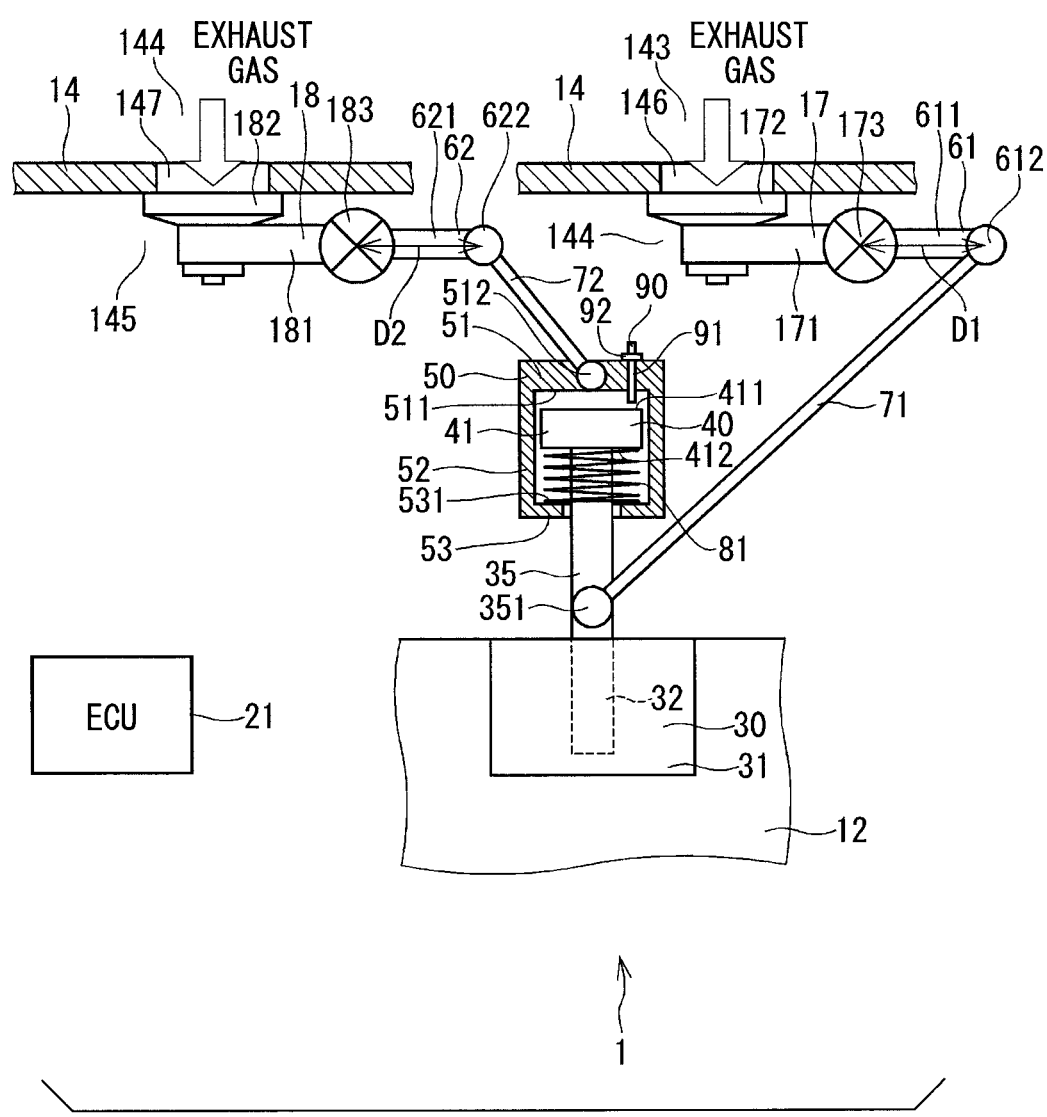
FIG. 3 is a schematic diagram showing the valve drive apparatus of the first embodiment.

As shown in FIG. 3, the valve drive apparatus 1 includes an actuator 30, a shaft (also referred to as a shaft portion) 35, a first member 40, a second member 50, a first valve lever 61, a second valve lever 62, a first rod 71, a second rod 72, a spring (serving as an urging device and a resilient member) 81, and a gap forming portion 90.

The actuator 30 includes a housing 31 and an output shaft 32. The output shaft 32 is configured into a rod form. The output shaft 32 is received in the housing 31 and is axially reciprocatable. In the present embodiment, when an electric power is supplied to the actuator 30, the actuator 30 axially drives, i.e., axially reciprocates the output shaft 32. The actuator 30 is installed to the supercharger 3 such that the housing 31 is fixed to the compressor housing 12.

The ECU 21 controls the electric power supplied to the actuator 30 to control the axial movement of the output shaft 32.

The shaft 35 is configured into a rod form and is coaxially and integrally formed with the output shaft 32 of the actuator 30. In this way, the shaft 35 can axially reciprocate integrally with the output shaft 32. The shaft 35 serves as an intermediate shaft placed between the output shaft 32 and the first and second valves 17, 18. Furthermore, the shaft 35 includes a shaft part 351, which is configured into a generally cylindrical tubular form and extends in a direction perpendicular to the axis.

The first member 40 includes a main body 41. The main body 41 is configured into a generally circular plate form. A center part of one side surface of the main body 41 is connected to, i.e., joined to an end part of the shaft 35, which is opposite from the actuator 30. That is, the main body 41 is placed along the axis of the shaft 35. In this way, the main body 41 can axially reciprocate together with the output shaft 32 and the shaft 35. In other words, the main body 41 is movable integrally with the output shaft 32 and the shaft 35. A first contact part 411 is formed in the other side surface of the main body 41. A first engaging part 412 is formed in the one side surface of the main body 41.

The second member 50 includes a main body 51, a tubular portion 52, and an extension 53. The main body 51 is configured into a generally circular plate form. A second contact part 511 is formed in one side surface of the main body 51. A shaft part 512 is formed in the main body 51. The shaft part 512 is configured into a generally cylindrical tubular form and extends in a direction (radial direction), which is parallel to a plane of the main body 51.

The tubular portion 52 is configured into a tubular form and extends from an outer peripheral edge part of the one side surface of the main body 51 in a direction (a plate thickness direction of the main body 51), which is perpendicular to the plane of the main body 51. The extension 53 is configured into an annular form and radially inwardly extends from an opposite end part of the tubular portion 52, which is opposite from the main body 51. A second engaging part 531 is formed in a surface of the extension 53, which is located on a side where the main body 51 is placed.

The second member 50 is placed along the axis of the shaft 35 such that the first member 40 is placed between the second contact part 511 and the second engaging part 531, and the first contact part 411 of the first member 40 is opposed to the second contact part 511. Therefore, when the second member 50 and the first member 40 are axially moved relative to each other, the second contact part 511 and the first contact part 411 can contact with each other.

The first valve lever 61 includes a main body 611, and a first valve lever shaft 612. The main body 611 is configured into a rod form and is fixed to the first valve shaft 173 at one end part of the main body 611. In this way, the main body 611 (the first valve lever 61) can rotate integrally with the first valve shaft 173. Thus, when the main body 611 is rotated integrally with the first valve shaft 173, the first valve 17 is opened or closed.

The first valve lever shaft 612 is configured into a generally cylindrical tubular form and is provided at the other end part of the main body 611. An axis of the first valve lever shaft 612 is parallel to the axis of the first valve shaft 173 and is placed at a location, which is spaced from the axis of the first valve shaft 173 by a first predetermined distance D1.

The second valve lever 62 includes a main body 621, and a second valve lever shaft 622. The main body 621 is configured into a rod form and is fixed to the second valve shaft 183 at one end part of the main body 621. In this way, the main body 621 (the second valve lever 62) can rotate integrally with the second valve shaft 183. Thus, when the main body 621 is rotated integrally with the second valve shaft 183, the second valve 18 is opened or closed.

The second valve lever shaft 622 is configured into a generally cylindrical tubular form and is provided at the other end part of the main body 621. An axis of the second valve lever shaft 622 is parallel to the axis of the second valve shaft 183 and is placed at a location, which is spaced from the axis of the second valve shaft 183 by a second predetermined distance D2.

The first rod 71 is configured into a rod form. The first rod 71 is rotatably connected to the first valve lever shaft 612 at one end part of the first rod 71 and is rotatably connected to the shaft part 351 of the shaft 35 at the other end part of the first rod 71.

The second rod 72 is configured into a rod form. The second rod 72 is rotatably connected to the second valve lever shaft 622 at one end part of the second rod 72 and is rotatably connected to the shaft part 512 of the second member 50 at the other end part of the second rod 72.

The spring 81 is made of a resilient member that is made of, for example, metal. The spring 81 is configured into a coil form. That is, the spring 81 is a coil spring. The spring 81 is placed on a radially outer side of the shaft 35 and is held between the first member 40 and the extension 53 of the second member 50. The spring 81 is engaged with the first engaging part 412 of the first member 40 at one end part of the spring 81 and is engaged with the second engaging part 531 of the second member 50 at the other end part of the spring 81. In the present embodiment, the spring 81 has a predetermined modulus of elasticity and has an axially expanding force. Specifically, the spring 81 urges the first member 40 and the second member 50 to urge the first contact part 411 and the second contact part 511 toward each other.

In the present embodiment, the gap forming portion 90 is formed in the second member 50. The gap forming portion 90 includes a screw part 91 and a nut 92. The screw part 91 is configured into a generally cylindrical rod form and has a male thread in an outer peripheral wall of the screw part 91. The screw part 91 is threaded into a threaded hole, which is formed in the main body 51 (the second contact part 511) and has a female thread formed in an inner peripheral wall of the threaded hole. When the screw part 91 is threaded into the threaded hole of the main body 51, the screw part 91 projects from the second contact part 511 by a predetermined amount toward the first contact part 411. The amount of projection of the screw part 91 from the second contact part 511 toward the first contact part 411 can be adjusted by adjusting the amount of insertion of the screw part 91 into the threaded hole of the main body 51.

The nut 92 is configured into an annular form and has a female thread, which corresponds to the male thread of the screw part 91, in an inner peripheral wall of the nut 92. The nut 92 is threadably installed to the screw part 91 from an end of the screw part 91, which is opposite from the first contact part 411, such that the nut 92 contacts the main body 51. In this way, the screw part 91 is non-displaceably held relative to the main body 51.

Figure 4A:
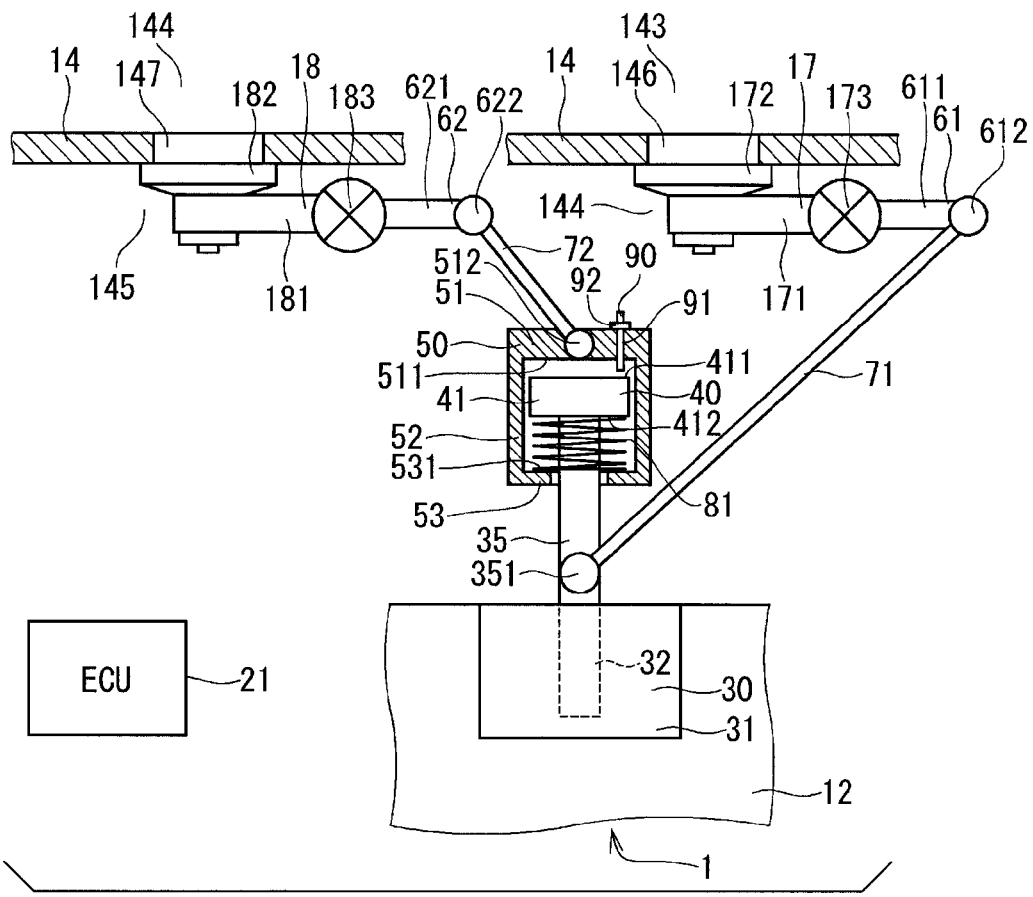
FIG. 4A is a schematic diagram showing the valve drive apparatus of the first embodiment in an operational state where a first valve and a second valve are both closed.
Figure 5A:
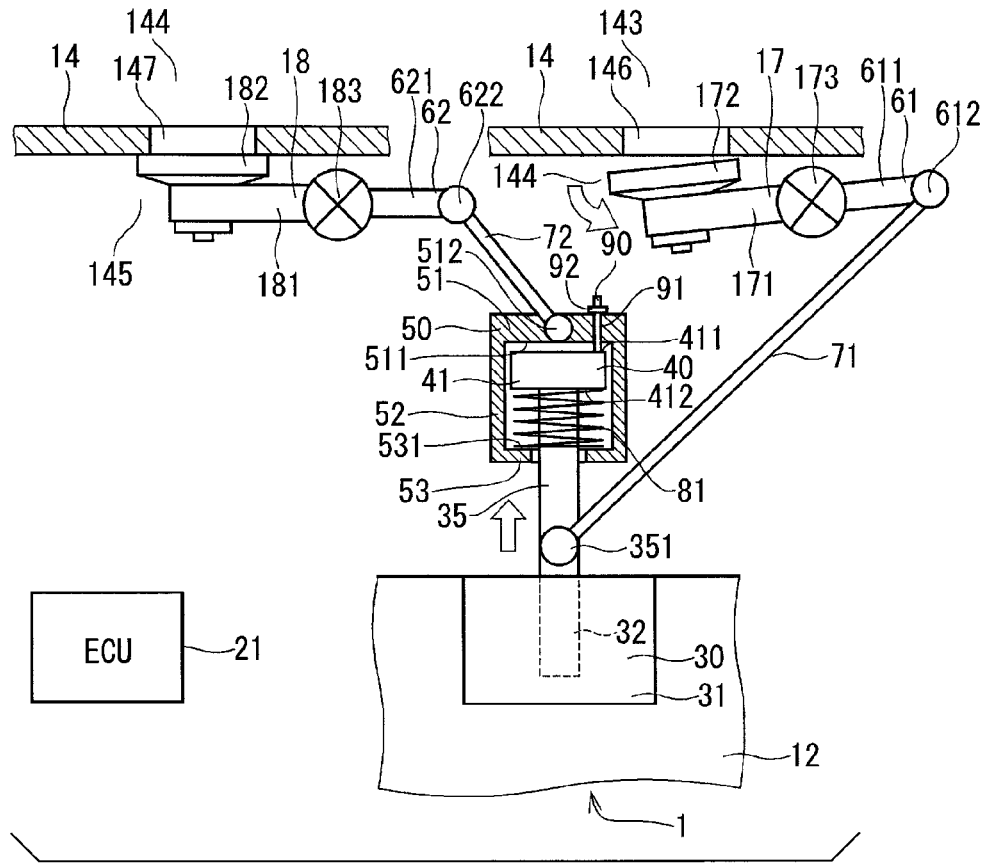
FIG. 5A is a schematic diagram showing the valve drive apparatus of the first embodiment in an operational state where the actuator is driven for a predetermined amount.

As shown in FIGS. 3 and 4A, in the state where the first valve 17 and the second valve 18 are both held in the valve closed state (fully closed state), the screw part 91 and the first contact part 411 are spaced from each other. In contrast, as shown in FIG. 5A, in the state where the second valve 18 is held in the valve closed state (the fully closed state), when the first valve 17 is opened for a predetermined amount, the screw part 91 and the first contact part 411 contact with each other. At this time, a predetermined gap is formed between the first contact part 411 and the second contact part 511.

In the present embodiment, as shown in FIG. 3, the first valve lever 61 and the second valve lever 62 are formed such that the first predetermined distance D1 and the second predetermined distance D2 are set to be generally equal to each other.

As discussed above, in the present embodiment, the shaft 35, the first rod 71, the first valve lever 61, the second rod 72, and the second valve lever 62 form a link mechanism. When the output shaft 32 and the shaft 35 are axially moved by a drive force of the actuator 30, the motion of the output shaft 32 and the shaft 35 is transmitted to the first valve 17 and the second valve 18 through the link mechanism to open or close the first valve 17 and the second valve 18.

Next, the operation of the valve drive apparatus 1 of the present embodiment will be described with reference to FIGS. 4A to 6B.

Figure 4B:
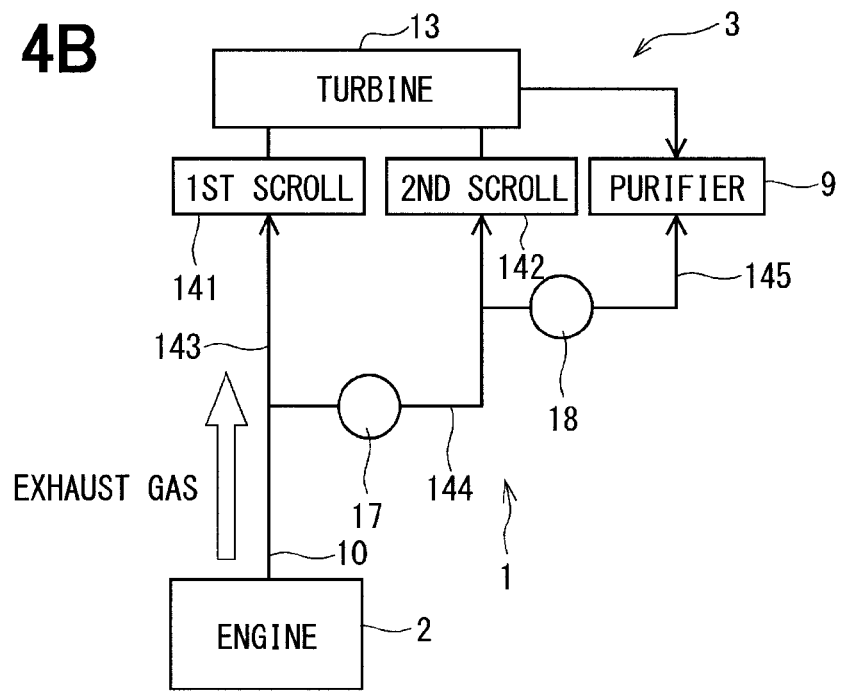
FIG. 4B is a diagram indicating a corresponding state of the supercharger, which corresponds to FIG. 4A.

As shown in FIG. 4A, in the state where the first valve 17 and the second valve 18 are both held in the valve closed state (the fully closed state), the first contact part 411 and the screw part 91 are spaced from each other. The drive amount of the output shaft 32, i.e., the drive amount (also referred to as the amount of stroke) of the actuator 30 at this time will be denoted as a first drive amount K1. At this time, the urging force of the spring 81 is exerted against the second valve 18 through the second member 50, the second rod 72, and the second valve lever 62 to urge the second valve 18 in the valve closing direction. In this way, the fully closed state of the second valve 18 is maintained. Furthermore, at this time, the urging force of the spring 81 is exerted against the first member 40 (the shaft 35, the output shaft 32). Also, at this time, as shown in FIG. 4B, the exhaust gas is supplied to the turbine 13 through the first scroll 141.

Furthermore, in the valve closed state of the second valve 18, the first member 40 (the shaft 35, the output shaft 32) can be axially moved by the urging force of the spring 81 from a position (see FIG. 4A), at which the first valve 17 is closed, to a position (see FIG. 5A), at which the first contact part 411 and the screw part 91 contact with each other.

In the state shown in FIG. 4A, when the first member 40 (the shaft 35, the output shaft 32) is moved in a direction away from the actuator 30 upon driving of the actuator 30 through the control operation of the ECU 21, this motion of the first member 40 (the shaft 35, the output shaft 32) is transmitted to the first valve 17 through the first rod 71 and the first valve lever 61. Furthermore, at this time, the first contact part 411 is moved toward the second contact part 511 (the gap forming portion 90).

Figure 5B:
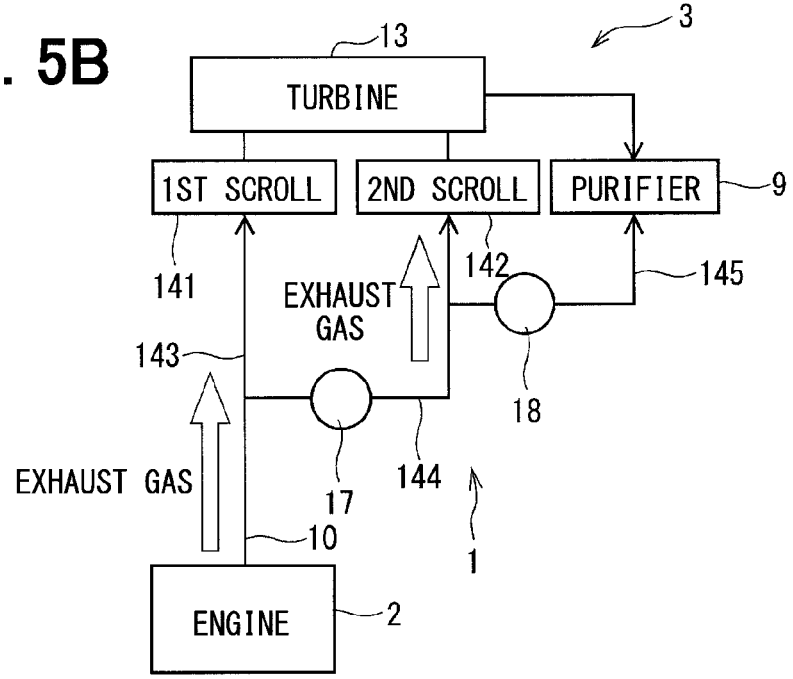
FIG. 5B is a diagram indicating a corresponding state of the supercharger, which corresponds to FIG. 5A.

When the first member 40 (the shaft 35, the output shaft 32) is further moved by the actuator 30 through the control operation of the ECU 21, the first contact part 411 contacts the screw part 91 of the gap forming portion 90 (see FIG. 5A). At this time, the drive amount of the actuator 30 will be denoted as a second drive amount K2. At this time, the first valve 17 is held in the state where the first valve 17 is opened for a predetermined amount, and the second valve 18 is held in the valve closed state (the fully closed state). Also, at this time, as shown in FIG. 5B, the exhaust gas is supplied to the turbine 13 through the first scroll 141 and the second scroll 142.

When the first member 40 (the shaft 35, the output shaft 32) is further moved by the actuator 30 through the control operation of the ECU 21, the second member 50 is axially moved together with the first member 40 in the state where the first contact part 411 and the screw part 91 contact with each other. In this way, when the second member 50 is moved in a direction away from the actuator 30, this motion of the second member 50 is transmitted to the second valve 18 through the second rod 72 and the second valve lever 62. Therefore, the second valve 18 is opened. At this time, the urging force of the spring 81 is canceled between the first member 40 and the second member 50 due to the contact between the first contact part 411 and the screw part 91. Therefore, the urging force of the spring 81 is not exerted against the output shaft 32 of the actuator 30.

Figure 6A:
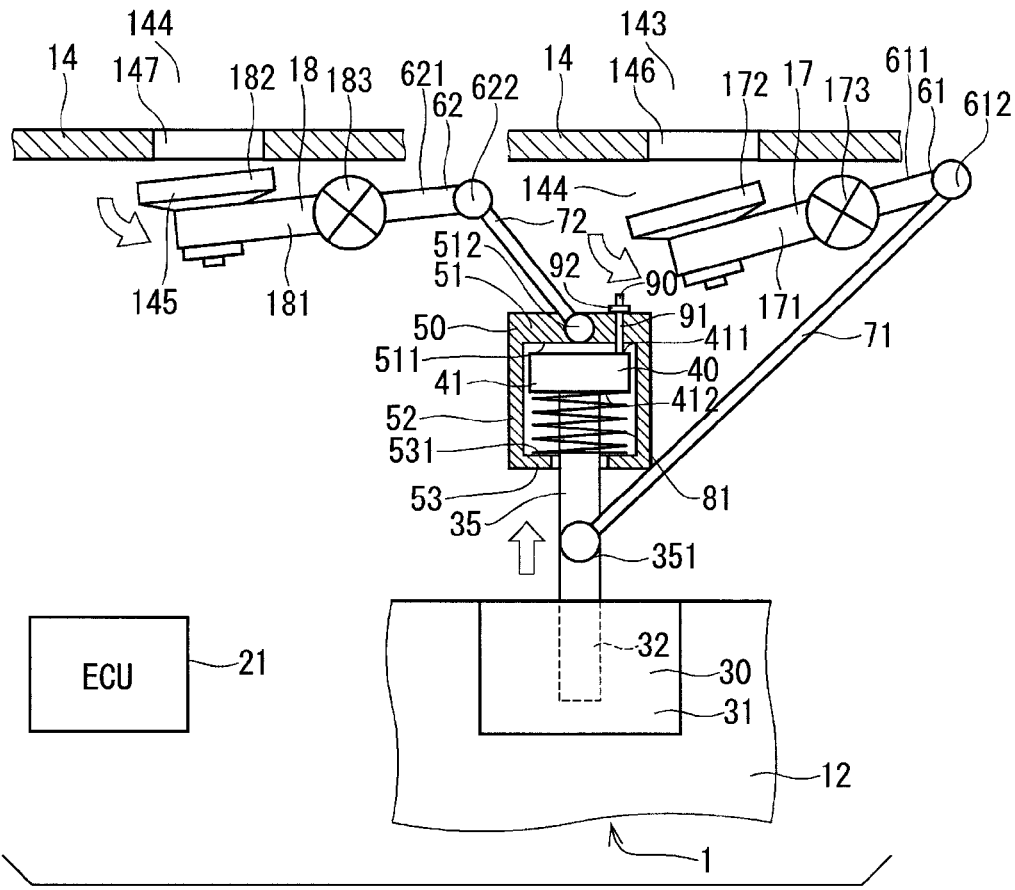
FIG. 6A is a schematic diagram showing the valve drive apparatus of the first embodiment in a state where the actuator is driven for a predetermined amount from an operational state shown in FIG. 5A.

When the first member 40 (the shaft 35, the output shaft 32) is further moved by the actuator 30 through the control operation of the ECU 21, the second valve 18 is opened (increasing the opening degree) along with the first valve 17 and is thereby placed in the state shown in FIG. 6A.

Figure 6B:
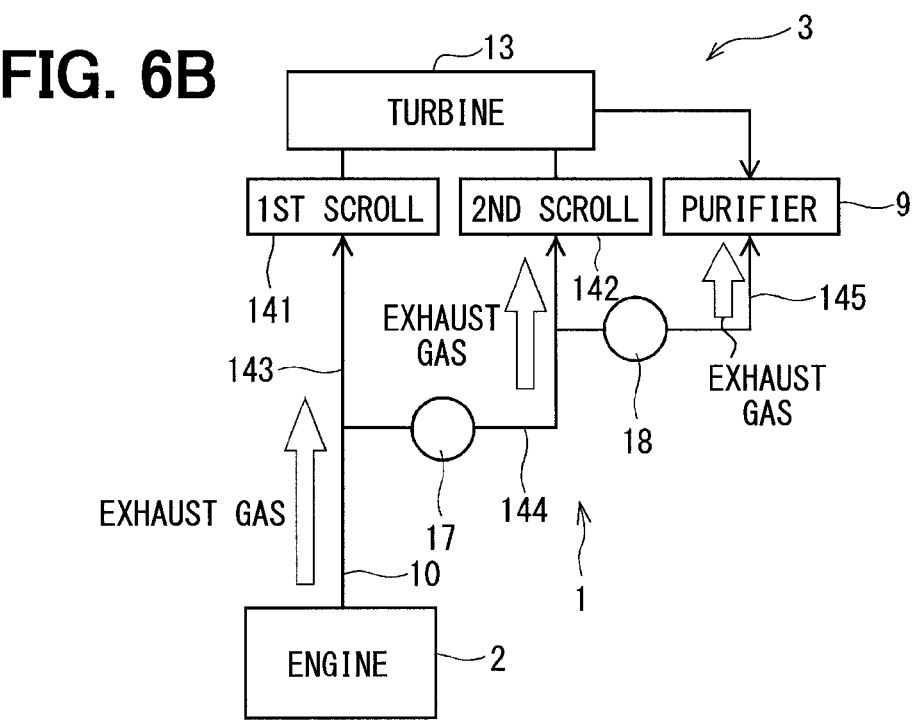
FIG. 6B is a diagram indicating a corresponding state of the supercharger, which corresponds to FIG. 6A.

The actuator 30 can drive the first member 40 (the shaft 35, the output shaft 32) until the first member 40 (the shaft 35, the output shaft 32) is placed in the position shown in FIG. 6A. The drive amount of the actuator 30 in the state shown in FIG. 6A will be denoted as a third drive amount K3. At this time, the opening degree of the first valve 17 reaches it maximum opening degree, and the opening degree of the second valve 18 reaches its maximum opening degree. Also, at this time, as shown in FIG. 6B, the exhaust gas is supplied to the turbine 13 through the first scroll 141 and the second scroll 142, and the exhaust gas is also conducted to the exhaust emission purifier 9 while bypassing the turbine 13.

Figure 7A:
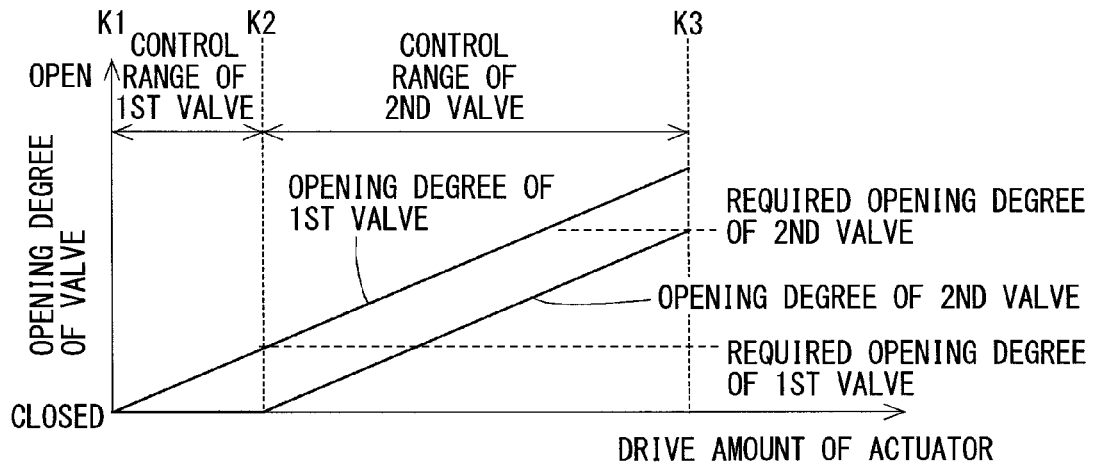
FIG. 7A is a diagram showing a relationship between a drive amount of the actuator of the valve drive apparatus and opening degrees of the first and second valves.

As shown in FIG. 7A, in the present embodiment, when the drive amount of the actuator 30 is the second drive amount K2, the opening degree of the first valve 17 reaches a required opening degree. The required opening degree is a minimum opening degree, at which a flow rate of the fluid passing through the valve no longer changes.

Furthermore, when the drive amount of the actuator 30 is the third drive amount K3, the opening degree of the second valve 18 reaches the required opening degree.

That is, in the present embodiment, a range from the first drive amount K1 to the second drive amount K2 is set as a substantial control range of the first valve 17. Furthermore, a range from the second drive amount K2 to the third drive amount K3 is set as a substantial control range of the second valve 18.

Figure 7B:
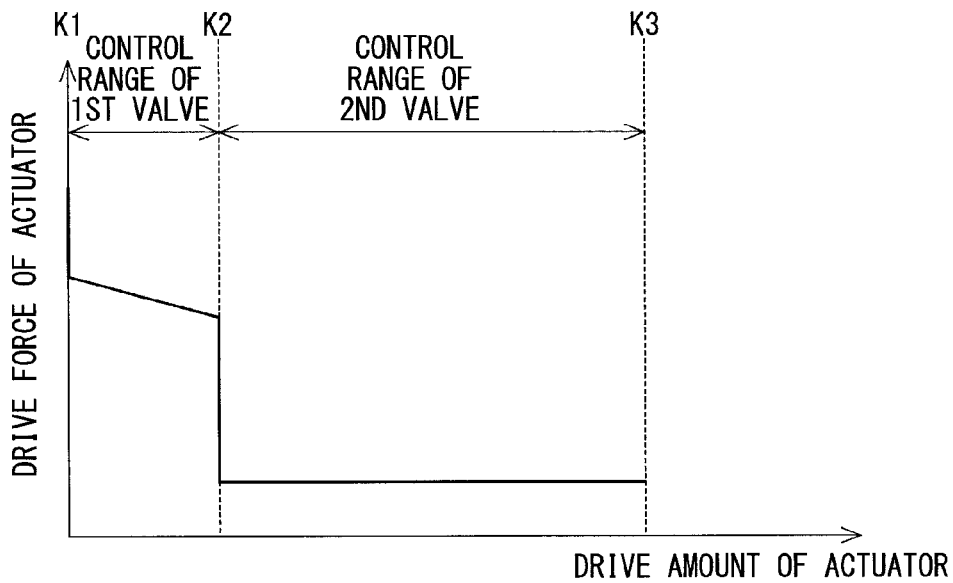
FIG. 7B is a diagram showing a relationship between the drive amount of the actuator and a drive force of the actuator.

Furthermore, as shown in FIG. 7B, in the range (the control range of the first valve 17) from the first drive amount K1 to the second drive amount K2 of the actuator 30, the load, which is exerted against the actuator 30, is obtained by subtracting the valve driving force of the exhaust gas pulsation (exerted in the valve opening direction) from the generated torque of the spring 81 (exerted in the valve closing direction). In the range from the second drive amount K2 to the third drive amount K3, the load, which is exerted against the actuator 30, is only the valve driving force of the exhaust gas pulsation (exerted in the valve opening direction).

As discussed above, in the present embodiment, when the first valve 17 is in the fully closed state, the predetermined gap is formed between the first member 40 and the second member 50 (the gap forming portion 90). In this way, the second valve 18 can be held in the valve closed state by urging the second valve 18 with the spring 81 until the first valve 17 is opened to the predetermined opening degree or larger. Thus, the first valve 17 (the change valve) can be driven within the predetermined range while the second valve 18 (the waste gate valve) is held in the fully closed state with the urging force of the spring 81. When the first valve 17 is opened to the predetermined opening degree or larger, the first member 40 and the gap forming portion 90 (the screw part 91) contact with each other, and the second valve 18 is opened synchronously with the first valve 17 through the second valve lever 62, the second rod 72, the second member 50, the first member 40, the shaft 35, the first rod 71, and the first valve lever 61.

As discussed above, according to the present embodiment, the link mechanism is formed with the fewer number of the constituent members, and the two valves (the first valve 17 and the second valve 18) can be driven by the single actuator 30. Therefore, the costs of the constituent members of the valve drive apparatus 1 and the manufacturing costs of the valve drive apparatus 1 can be reduced.

Furthermore, in the present embodiment, in the closed state of the second valve 18, when the first valve 17 is driven, the urging force of the spring 81 is exerted against the output shaft 32 of the actuator 30 through the first member 40. At this time, the load of the actuator 30 becomes large. In contrast, when the second valve 18 is opened, i.e., when the second valve 18 is driven together with the first valve 17, the urging force of the spring 81 is canceled between the first member 40 and the second member 50 through contact between the first member 40 and the gap forming portion 90 (the screw part 91). Therefore, the urging force of the spring 81 is not exerted against the output shaft 32 of the actuator 30. Therefore, in the case where the second valve 18 is mainly opened as the operation of the engine 2, the load of the actuator 30 is reduced, and thereby the stress on the actuator 30 can be reduced.

Figure 8:
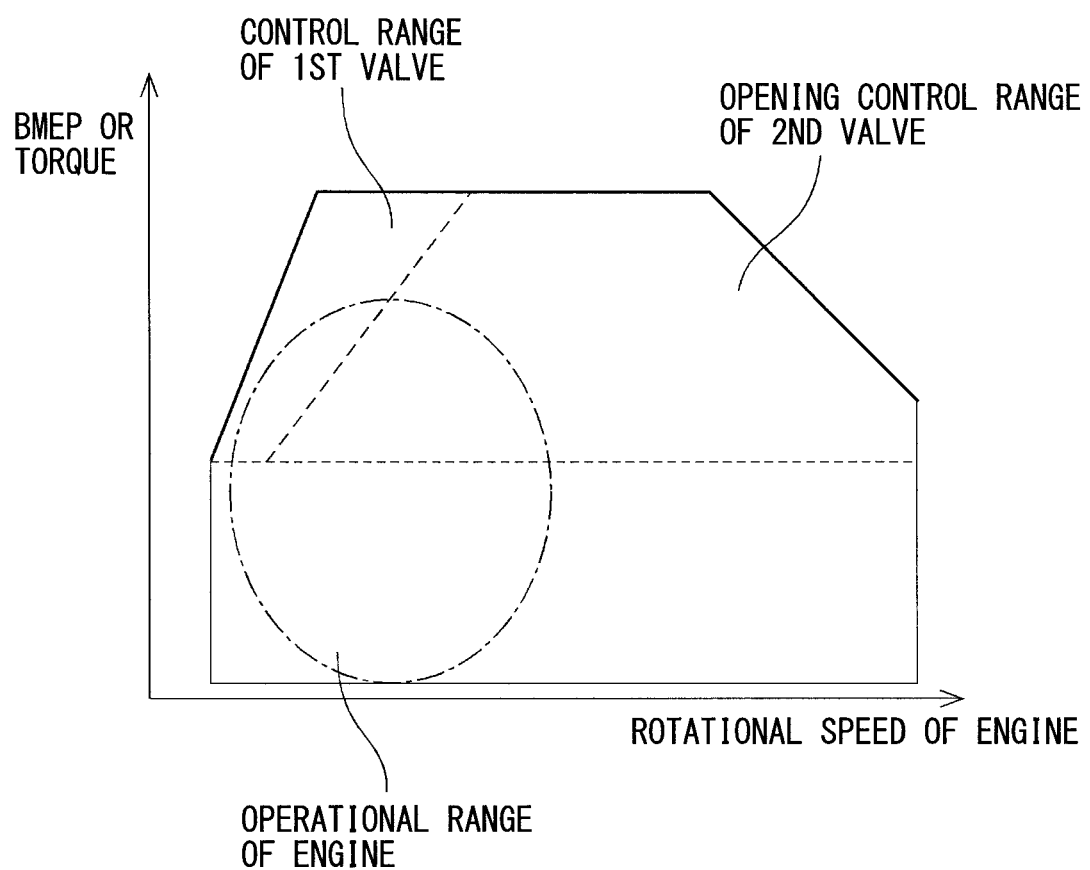
FIG. 8 is a diagram showing a relationship between a rotational speed of an internal combustion engine provided with the valve drive apparatus of the first embodiment and a brake mean effective pressure (BMEP) or a torque.

FIG. 8 is a diagram showing a relationship between the rotational speed of the engine 2 and a brake mean effective pressure (BMEP) or the torque. As shown in FIG. 8, the operational range of the engine 2 is substantially in the valve opening control range of the second valve 18. Therefore, in the present embodiment, the stress of the actuator 30 can be reduced substantially in the entire operational range of the engine 2. Therefore, the lifetime of the actuator 30 and its peripheral members can be lengthened. Furthermore, in the present embodiment, the actuator 30 is the electric actuator. Therefore, the electric power consumption can be reduced.

Also, in the present embodiment, the spring 81 is made of the resilient member, which has the predetermined modulus of elasticity. Furthermore, the one end part of the spring 81 is engaged with the first engaging part 412 of the first member 40, and the other end part of the spring 81 is engaged with the second engaging part 531 of the second member 50. In this way, the first valve 17 can be driven within the predetermined range while maintaining the fully closed state of the second valve 18 with the urging force of the spring 81. The actuator 30 is installed to the compressor housing 12. Therefore, it is possible to limit the increasing of the temperature of the spring 81 to the high temperature with the heat of the exhaust gas. Thus, the spring 81 can be made of the low cost member, which has the relatively low heat resistance.

Furthermore, in the present embodiment, the gap forming portion 90 is formed in and projects from the second contact part 511 toward the first contact part 411. The gap forming portion 90 forms the predetermined gap between the first contact part 411 and the second contact part 511 when the gap forming portion 90 contacts the first contact part 411. The gap forming portion 90 (the screw part 91) is formed such that the amount of projection of the gap forming portion 90 from the second contact part 511 is variable (adjustable). In the present embodiment, the range, which is from the start of the valve opening of the first valve 17 to the start of the valve opening of the second valve 18, is determined by the gap between the first contact part 411 and the second contact part 511. In the present embodiment, the gap between the first contact part 411 and the second contact part 511 can be adjusted with the gap forming portion 90. Therefore, by adjusting the variations in the positional relationship between the first member 40 and the second member 50 and the variations in the urging force of the spring 81, the control range (the operational range) of the first valve 17 can be accurately determined. Thereby, the tolerances of the components can be increased, and the manufacturing costs can be reduced.

Second Embodiment

Figure 9:
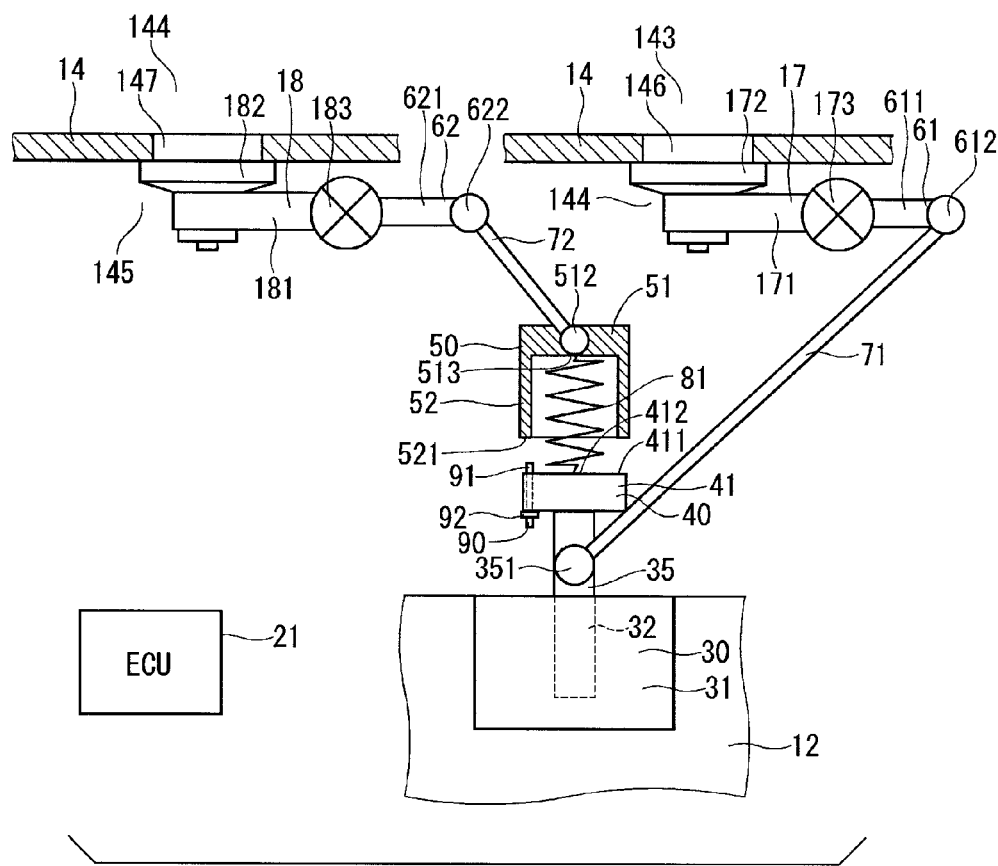
FIG. 9 is a schematic diagram showing a valve drive apparatus according to a second embodiment of the present disclosure.

FIG. 9 shows a valve drive apparatus according to a second embodiment of the present disclosure. In the second embodiment, the structures of the first member, the second member and the urging device are different from those of the first embodiment.

In the second embodiment, the first contact part 411, which is configured into an annular form, is formed along an outer peripheral edge part of the other side surface of the main body 41 of the first member 40. Furthermore, the first engaging part 412 is formed in a center part of the other side surface of the main body 41.

The second member 50 does not include the extension 53, which is discussed in the first embodiment. A second contact part 521 is formed in the end part of the tubular portion 52 of the second member 50, which is opposite from the main body 51. The second contact part 521 can contact the first contact part 411. A second engaging part 513 is formed in a center part of the one side surface of the main body 51 of the second member 50.

In the present embodiment, the spring 81 is placed between the main body 51 and the first member 40 such that the spring 81 is received in the inside of the tubular portion 52 of the second member 50. The spring 81 is engaged with the first engaging part 412 of the first member 40 at one end part of the spring 81 and is engaged with the second engaging part 513 of the second member 50 at the other end part of the spring 81. In the present embodiment, the spring 81 has a predetermined modulus of elasticity and has an axially contracting force. Specifically, the spring 81 urges the first member 40 and the second member 50 to urge the first contact part 411 and the second contact part 521 toward each other.

In the present embodiment, the gap forming portion 90 is provided to the first contact part 411 of the main body 41. The amount of projection of the screw part 91 from the first contact part 411 toward the second contact part 521 can be adjusted. In this way, it is possible to adjust a size of the gap between the first contact part 411 of the first member 40 and the second contact part 521 of the second member 50.

Thus, even in the second embodiment, the first valve 17 (the change valve) can be driven within the predetermined range while the second valve 18 (the waste gate valve) is held in the fully closed state with the urging force of the spring 81.

Third Embodiment

Figure 10:
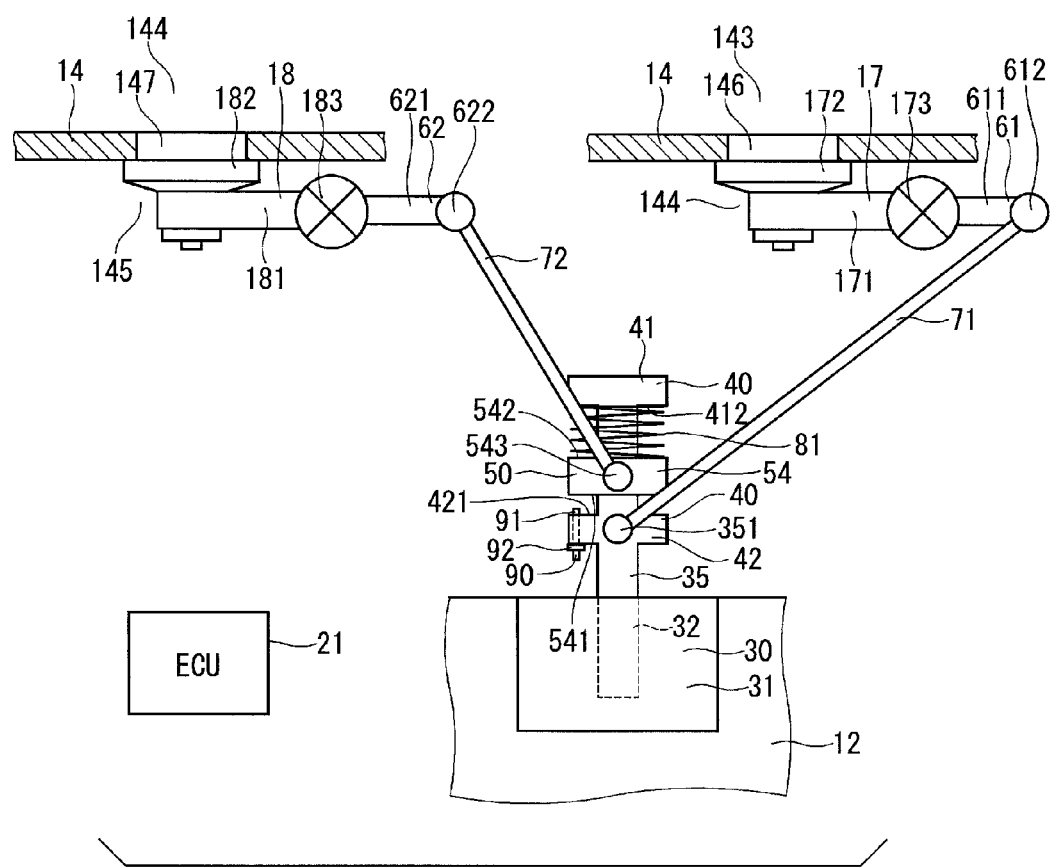
FIG. 10 is a schematic diagram showing a valve drive apparatus according to a third embodiment of the present disclosure.

FIG. 10 shows a valve drive apparatus according to a third embodiment of the present disclosure. In the third embodiment, the structures of the first member, the second member and the urging device are different from those of the first embodiment.

In the third embodiment, the first member 40 further includes a main body 42. The main body 42 is formed to radially outwardly project from an axial intermediate part of the shaft 35. A first contact part 421 is formed in a main body 41 side of the main body 42. Here, the main body 41 serves as an upper member of the present disclosure, and the main body 42 serves as a lower member of the present disclosure.

The second member 50 includes a main body 54. The main body 54 is configured into a generally cylindrical tubular form. The main body 54 is placed between the main body 41 and the main body 42 such that the main body 54 can axially reciprocate (i.e., axially reciprocatable) in a state where the shaft 35 is received through the main body 54. A second contact part 541 is formed in a main body 42 side of the main body 54. A second engaging part 542 is formed in a main body 41 side of the main body 54. Furthermore, a shaft part 543 is formed in the main body 54. The shaft part 543 is configured into a generally cylindrical tubular form and extends in a radial direction of the main body 54. The other end part of the second rod 72 is rotatably connected to the shaft part 543.

In the present embodiment, the spring 81 is placed on the radially outer side of the shaft 35 and is located between the main body 41 and the main body 42 of the first member 40. The spring 81 is engaged with the first engaging part 412 of the first member 40 at one end part of the spring 81 and is engaged with the second engaging part 542 of the second member 50 at the other end part of the spring 81. In the present embodiment, the spring 81 has a predetermined modulus of elasticity and has an axially expanding force. Specifically, the spring 81 urges the first member 40 and the second member 50 to urge the first contact part 421 and the second contact part 541 toward each other.

In the present embodiment, the gap forming portion 90 is provided to the first contact part 421 of the main body 42. The amount of projection of the screw part 91 from the first contact part 421 toward the second contact part 541 can be adjusted. In this way, it is possible to adjust a size of the gap between the first contact part 421 of the first member 40 and the second contact part 541 of the second member 50.

Thus, even in the third embodiment, the first valve 17 (the change valve) can be driven within the predetermined range while the second valve 18 (the waste gate valve) is held in the fully closed state with the urging force of the spring 81.

Fourth Embodiment

Figure 11:
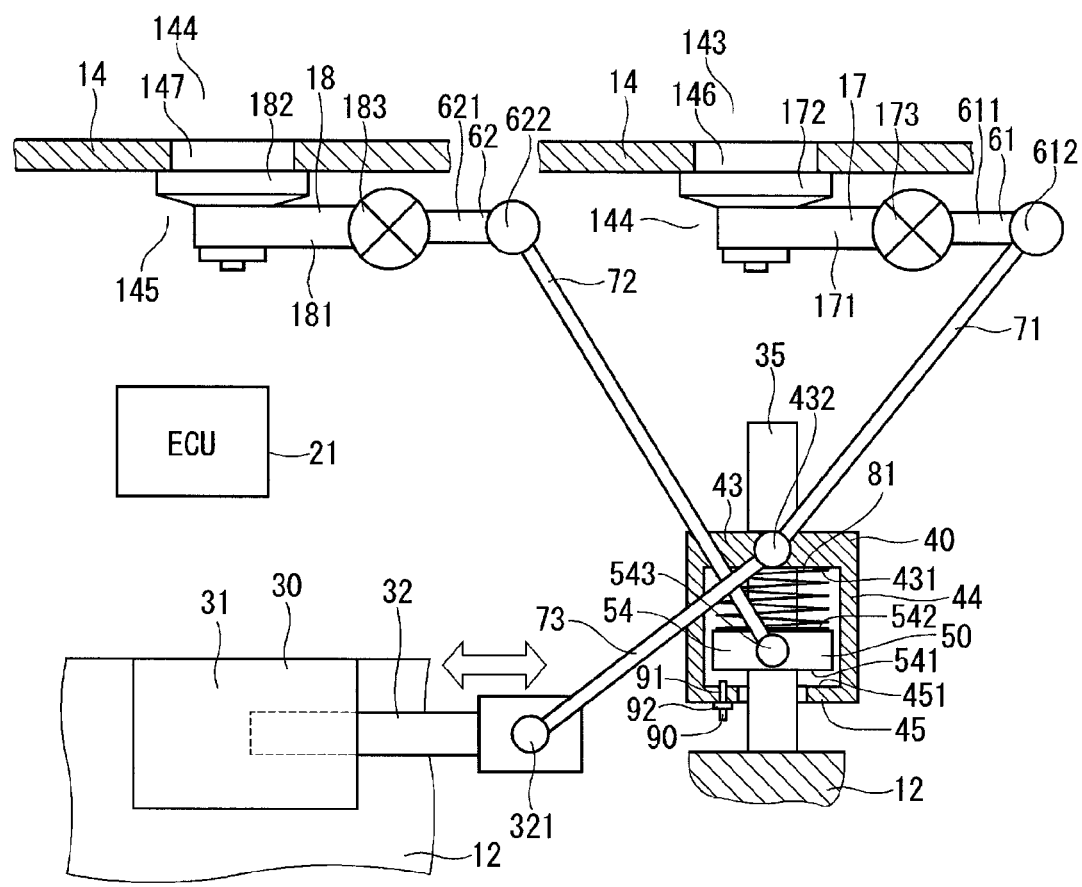
FIG. 11 is a schematic diagram showing a valve drive apparatus according to a fourth embodiment of the present disclosure.

FIG. 11 shows a valve drive apparatus according to a fourth embodiment of the present disclosure. In the fourth embodiment, the structures of the actuator, the shaft, the first member, and the second member are different from those of the first embodiment.

In the fourth embodiment, the shaft 35 is provided separately from the output shaft 32 of the actuator 30. One end part of the shaft 35 is fixed to the compressor housing 12.

The housing 31 of the actuator 30 is fixed to the compressor housing 12 such that the output shaft 32 is generally perpendicular to the axis of the shaft 35. Furthermore, a shaft part 321, which is configured into a generally cylindrical tubular form and extends in a radial direction of the output shaft 32, is formed in the distal end part of the output shaft 32.

The first member 40 includes a main body 43, a tubular portion 44, and an extension 45.

The main body 43 is configured into a generally annular form. The main body 43 can axially reciprocate in a state where the shaft 35 is received through the main body 43. A first engaging part 431 is formed in one side surface of the main body 43. The tubular portion 44 is configured into a tubular form and extends from an outer peripheral edge part of the main body 43. The extension 45 is configured into an annular form and radially inwardly extends from an opposite end part of the tubular portion 44, which is opposite from the main body 43. A first contact part 451 is formed in a surface of the extension 53, which is located on a side where the main body 43 is placed. A shaft part 432 is formed in the main body 43. The shaft part 432 is configured into a generally cylindrical tubular form and extends in a direction (radial direction), which is parallel to a plane of the main body 43. The other end part of the first rod 71 is rotatably connected to the shaft part 432.

The second member 50 includes a main body 54. The structure of the second member 50 of the present embodiment is similar to the second member 50 of the third embodiment, and thereby the description of the second member 50 is omitted for the sake of simplicity.

In the present embodiment, the spring 81 is placed on the radially outer side of the shaft 35 and on the radially inner side of the tubular portion 44 and is located between the main body 43 and the main body 54. The spring 81 is engaged with the first engaging part 431 of the first member 40 at one end part of the spring 81 and is engaged with the second engaging part 542 of the second member 50 at the other end part of the spring 81. In the present embodiment, the spring 81 has a predetermined modulus of elasticity and has an axially expanding force. Specifically, the spring 81 urges the first member 40 and the second member 50 to urge the first contact part 451 and the second contact part 541 toward each other.

In the present embodiment, the gap forming portion 90 is provided to the first contact part 451 of the extension 45. The amount of projection of the screw part 91 from the first contact part 451 toward the second contact part 541 can be adjusted. In this way, it is possible to adjust a size of the gap between the first contact part 451 of the first member 40 and the second contact part 541 of the second member 50.

In the present embodiment, a third rod 73 is further provided. The third rod 73 is configured into a rod form. The third rod 73 is rotatably connected to the shaft part 321 of the output shaft 32 at one end part of the third rod 73 and is rotatably connected to the shaft part 432 of the first member 40 at the other end part of the third rod 73. With the above construction, when the output shaft 32 is axially moved in the axial direction thereof, the motion of the output shaft 32 is transmitted to the first valve 17 through the third rod 73, the first rod 71, and the first valve lever 61 to open or close the first valve 17.

As discussed above, in the present embodiment, the shaft 35 is provided separately from the output shaft 32. The first member 40 and the second member 50 are movable relative to the shaft 35. The other end part of the first rod 71 is connected to the first member 40. The third rod 73, which connects between the output shaft 32 and the first member 40, is further provided. In this way, the moving direction of the shaft 35 and the moving direction of the output shaft 32 can be made different from each other. Thereby, a degree of freedom with respect to the arrangement of the actuator 30 and the link mechanism can be improved.

Thus, even in the fourth embodiment, the first valve 17 (the change valve) can be driven within the predetermined range while the second valve 18 (the waste gate valve) is held in the fully closed state with the urging force of the spring 81.

Fifth Embodiment

Figure 12:
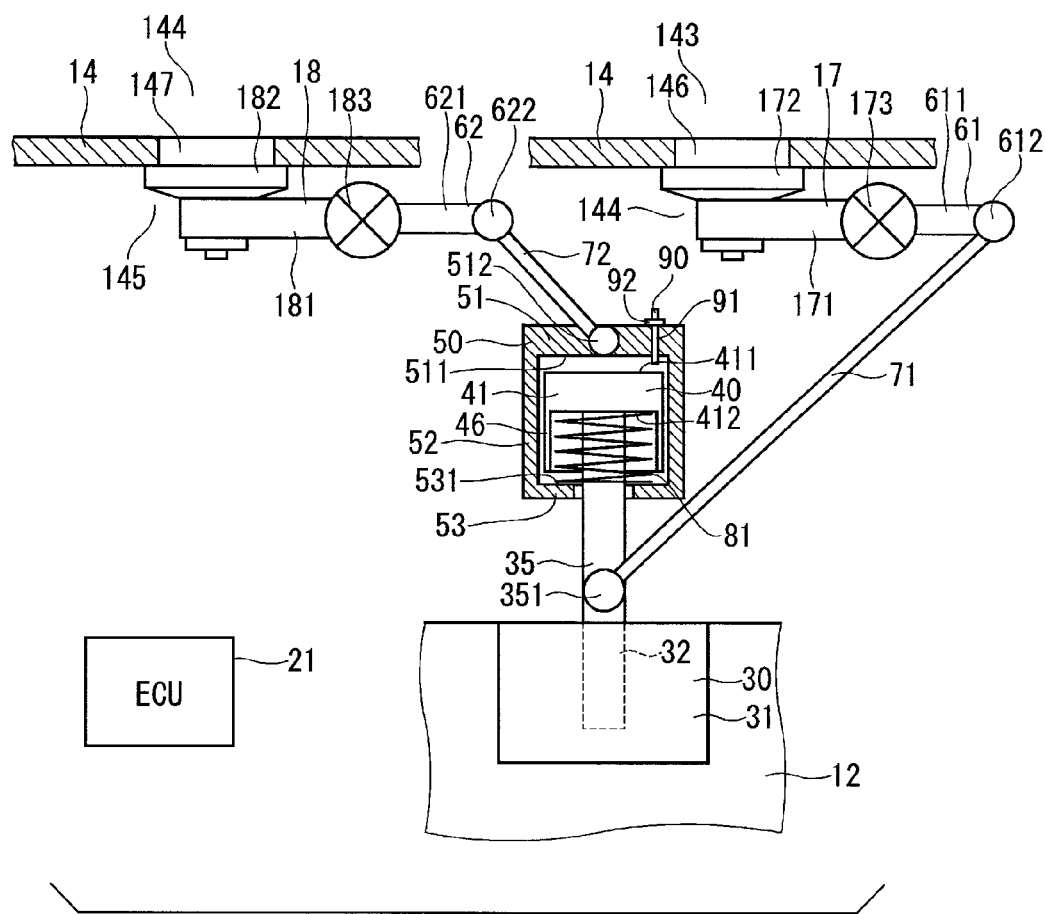
FIG. 12 is a schematic diagram showing a valve drive apparatus according to a fifth embodiment of the present disclosure.

FIG. 12 shows a valve drive apparatus according to a fifth embodiment of the present disclosure. In the fifth embodiment, the structure of the first member is different from that of the first embodiment.

In the fifth embodiment, the first member 40 further includes a tubular portion 46. The tubular portion 46 is configured into a generally cylindrical tubular form and extends from the outer peripheral edge part of the main body 41 toward the extension 53 of the second member 50. Specifically, the tubular portion 46 is coaxial with the shaft 35. The tubular portion 46 is placed on the radially inner side of the tubular portion 52 of the second member 50 and on the radially outer side of the spring 81.

In the present embodiment, an outer wall of the tubular portion 46 of the first member 40 and an inner wall of the tubular portion 52 can slide relative to each other. Therefore, when the second member 50 is moved relative to the first member 40, the orientation of the second member 50 is stable. In this way, the swing of the axis of the second member 50 relative to the shaft 35 can be limited, and thereby the lifetime of the corresponding members can be improved. Here, the tubular portion 46 serves as a first tubular portion of the present disclosure, and the tubular portion 52 serves as a second tubular portion of the present disclosure.

Sixth Embodiment

Figure 13A:
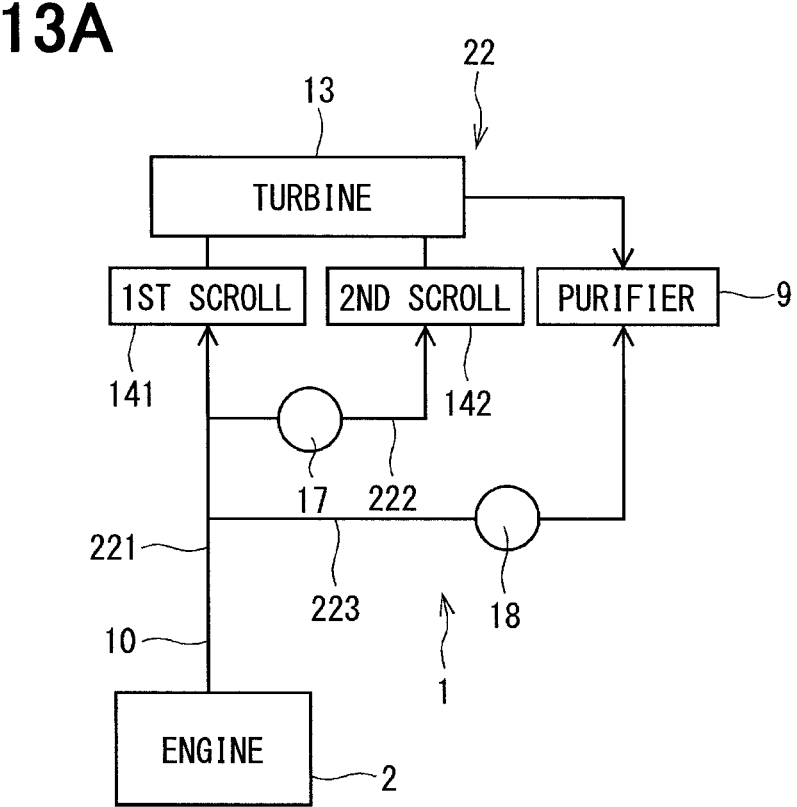
FIG. 13A is a schematic view showing a supercharger provided with a valve drive apparatus according to a sixth embodiment of the present disclosure.

FIG. 13A shows a valve drive apparatus according to a sixth embodiment of the present disclosure. In the sixth embodiment, the structure of the valve drive apparatus 1 is similar to that of the first embodiment. However, the structure of the supercharger, to which the valve drive apparatus 1 is installed, is different from the first embodiment.

In the sixth embodiment, the supercharger 22 includes a first flow path 221, a second flow path 222, and a third flow path 223. The first flow path 221 connects between the engine 2 and the first scroll 141. The second flow path 222 connects between the first flow path 221 and the second scroll 142. Here, the first flow path 221 and the second flow path 222 serve as an exhaust flow path of the present disclosure. The third flow path 223 connects between the first flow path 221 and the exhaust emission purifier 9 while bypassing the turbine 13. Here, the third flow path 223 serves as a bypass flow path of the present disclosure.

In the present embodiment, the first valve 17 (the change valve) is placed in the second flow path 222 such that the first valve 17 can open and close the second flow path 222. The second valve 18 (the waste gate valve) is placed in the third flow path 223 such that the second valve 18 can open and close the third flow path 223.

Even in the present embodiment, the advantages, which are similar to those of the first embodiment, can be achieved.

Seventh Embodiment

Figure 13B:
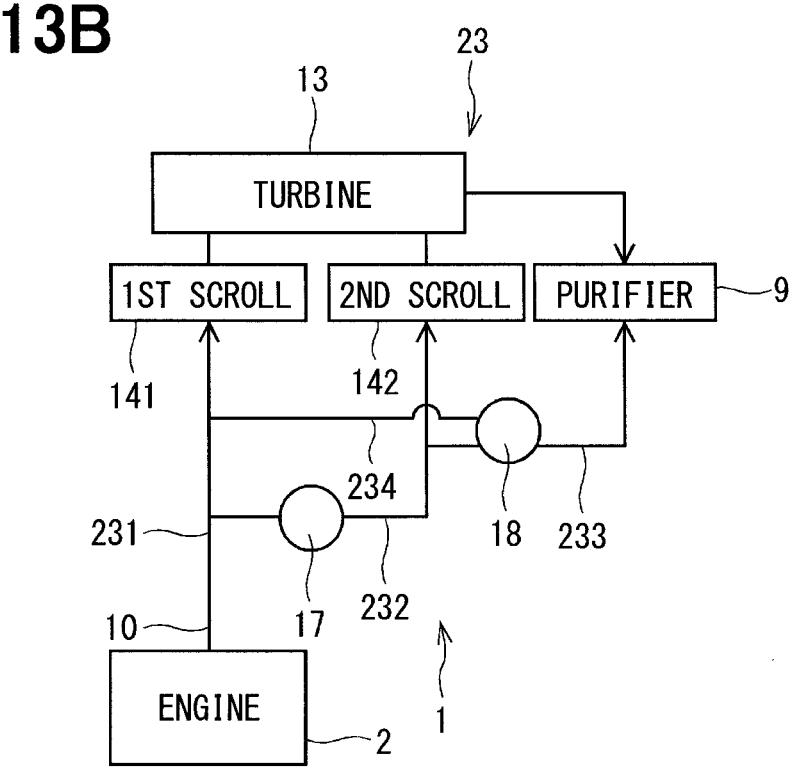
FIG. 13B is a schematic view showing a supercharger provided with a valve drive apparatus according to a seventh embodiment of the present disclosure.

FIG. 13B shows a valve drive apparatus according to a seventh embodiment of the present disclosure. In the seventh embodiment, the structure of the valve drive apparatus 1 is similar to that of the first embodiment. However, the structure of the supercharger, to which the valve drive apparatus 1 is installed, is different from the first embodiment.

In the seventh embodiment, the supercharger 23 includes a first flow path 231, a second flow path 232, a third flow path 233, and a fourth flow path 234. The first flow path 231 connects between the engine 2 and the first scroll 141. The second flow path 232 connects between the first flow path 231 and the second scroll 142. The third flow path 233 connects between the second flow path 232 and the exhaust emission purifier 9 while bypassing the turbine 13. The fourth flow path 234 connects between the first flow path 231 and the third flow path 233 while bypassing the turbine 13. Here, the first flow path 231 and the second flow path 232 serve as an exhaust flow path of the present disclosure. Furthermore, the third flow path 233 and the fourth flow path 234 serve as a bypass flow path of the present disclosure.

In the present embodiment, the first valve 17 (the change valve) is placed in the second flow path 232 such that the first valve 17 can open and close the second flow path 232. The second valve 18 (the waste gate valve) is placed in a connection between the third flow path 233 and the fourth flow path 234 such that the second valve 18 can open and close the third flow path 233 and the fourth flow path 234.

Even in the present embodiment, the advantages, which are similar to those of the first embodiment, can be achieved.

Eighth Embodiment

Figure 14:
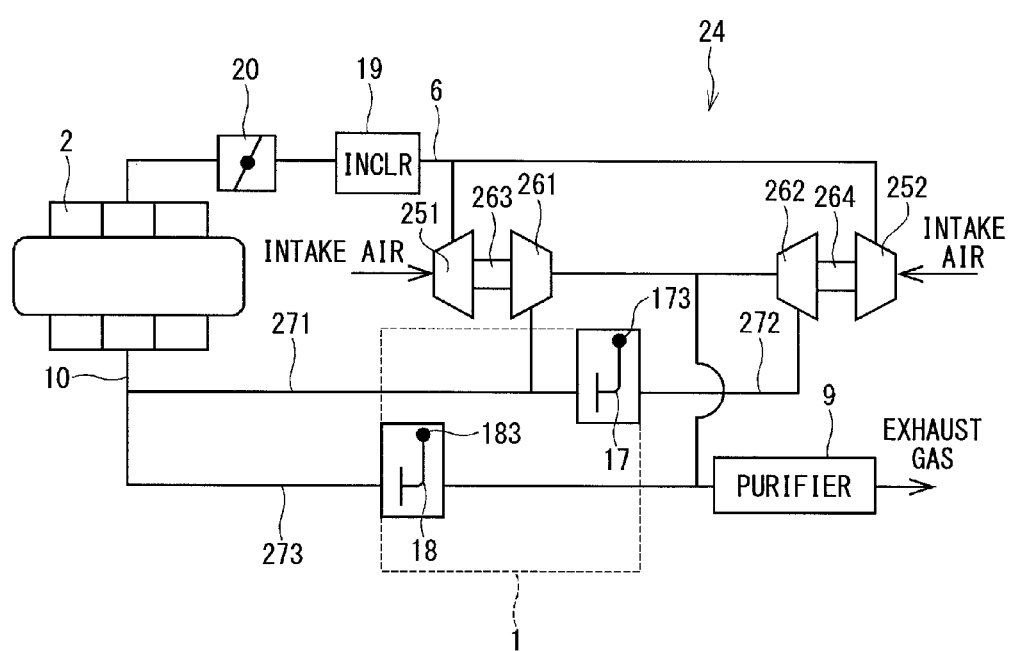
FIG. 14 is a schematic diagram showing a valve drive apparatus and a supercharger according to an eighth embodiment of the present disclosure.

FIG. 14 shows a valve drive apparatus according to an eighth embodiment of the present disclosure. In the eighth embodiment, the structure of the valve drive apparatus 1 is similar to that of the first embodiment. However, the subject apparatus, to which the valve drive apparatus of the fourth embodiment is applied, differs from that of the first embodiment.

In the eighth embodiment, the valve drive apparatus 1 is installed to a supercharger 24, which supercharges the intake air to the engine 2. The supercharger 24 includes a first compressor 251, a second compressor 252, a first turbine 261, a second turbine 262, a first shaft 263, a second shaft 264, the first valve 17 and the second valve 18.

The first compressor 251 and the second compressor 252 are placed in the intake passage 6, which guides the intake air to the engine 2.

The first turbine 261 and the second turbine 262 are placed in the exhaust passage 10, which conducts the exhaust gas outputted from the engine 2. The first turbine 261 is connected to the first compressor 251 through the first shaft 263. In this way, the first turbine 261 can rotate the first compressor 251 when the exhaust gas is supplied to the first turbine 261 to rotate the same. Here, the first turbine 261 is used as, for example, a low speed (small flow rate) turbine.

Furthermore, the second turbine 262 is connected to the second compressor 252 through the second shaft 264. In this way, the second turbine 262 can rotate the second compressor 252 when the exhaust gas is supplied to the second turbine 262 to rotate the same. Here, the second turbine 262 is used as, for example, a high speed (large flow rate) turbine.

In the present embodiment, a first exhaust flow path 271 and a second exhaust flow path 272 are formed in the exhaust passage 10. The first exhaust flow path 271 guides the exhaust gas from the engine 2 to the first turbine 261. The second exhaust flow path 272 guides the exhaust gas from the engine 2 to the second turbine 262. Here, an opposite end part of the second exhaust flow path 272, which is opposite from the second turbine 262, is connected to the first exhaust flow path 271.

Furthermore, a bypass flow path 273 connects between one side (upstream side) of the first turbine 261 and the second turbine 262, at which the internal combustion engine 2 is located, and an opposite side (downstream side) of the first turbine 261 and the second turbine 262, which is opposite from the internal combustion engine 2, in the exhaust passage 10, while the bypass flow path 273 bypasses the first turbine 261 and the second turbine 262.

The first valve 17 is placed in the second exhaust flow path 272 such that the first valve 17 can open and close the second exhaust flow path 272 upon rotation of the first valve 17 about the axis of the first valve shaft 173. The second valve 18 is placed in the bypass flow path 273 such that the second valve 18 can open and close the bypass flow path 273 upon rotation of the second valve 18 about the axis of the second valve shaft 183.

In the valve closed state of the first valve 17, the exhaust gas is guided to the first turbine 261 through the first exhaust flow path 271 to rotate the first turbine 261. In contrast, in the valve open state of the first valve 17, the exhaust gas is guided to the first turbine 261 through the first exhaust flow path 271 to rotate the first turbine 261 and is also guided to the second turbine 262 through the second exhaust flow path 272 to rotate the second turbine 262. As discussed above, the first valve 17 functions as the change valve and can control the amount of exhaust gas supplied to the two turbines (the first turbine 261 and the second turbine 262). That is, in the present embodiment, the supercharger 22 is a two-stage supercharger.

When the second valve 18 is in the valve open state, the portion of the exhaust gas in the exhaust passage 10 is conducted through the bypass flow path 273. Therefore, the rotational speed of the first turbine 261 and the rotational speed of the second turbine 262 are reduced to cause a reduction in the supercharging pressure. In this way, it is possible to limit the excessive increase of the supercharging pressure. As discussed above, the second valve 18 functions as the waste gate valve and controls the amount of exhaust gas, which bypasses the first turbine 261 and the second turbine 262.

The valve drive apparatus 1 is installed to the supercharger 24 in such a manner that the valve drive apparatus 1 can drive the first valve 17 and the second valve 18. Specifically, in the present embodiment, the valve drive apparatus 1 is applied to the two-stage supercharger (the supercharger 24), which includes the waste gate valve. The valve drive apparatus 1 drives the first valve 17 and the second valve (the waste gate valve) 18 while the first valve 17 controls the amount of exhaust gas supplied to the two turbines (the first turbine 261 and the second turbine 262), and the second valve 18 (the waste gate valve) controls the amount of exhaust gas, which bypasses the turbines (the first turbine 261 and the second turbine 262).

The actuator 30, the shaft 35, the first member 40, the second member 50, the first valve lever 61, the second valve lever 62, the first rod 71, the second rod 72, and the spring 81 of the present embodiment are the same as those of the first embodiment. Therefore, the first valve 17 (the change valve) can be driven within the predetermined range by the actuator 30 while maintaining the fully closed state of the second valve 18 (the waste gate valve) with the urging force of the spring 81. As a result, the advantages, which are similar to those of the first embodiment, can be achieved in the eighth embodiment.

Ninth Embodiment

FIGS. 15 to 19 show a valve drive apparatus according to a ninth embodiment of the present disclosure. The ninth embodiment is a modification of the first embodiment, and an actuator of the valve drive apparatus and its associated components are different from those of the first embodiment. In the following discussion, the components, which are similar to those of the first embodiment, are indicated by the same reference numerals and will not be described redundantly for the sake of simplicity.

Figure 15:
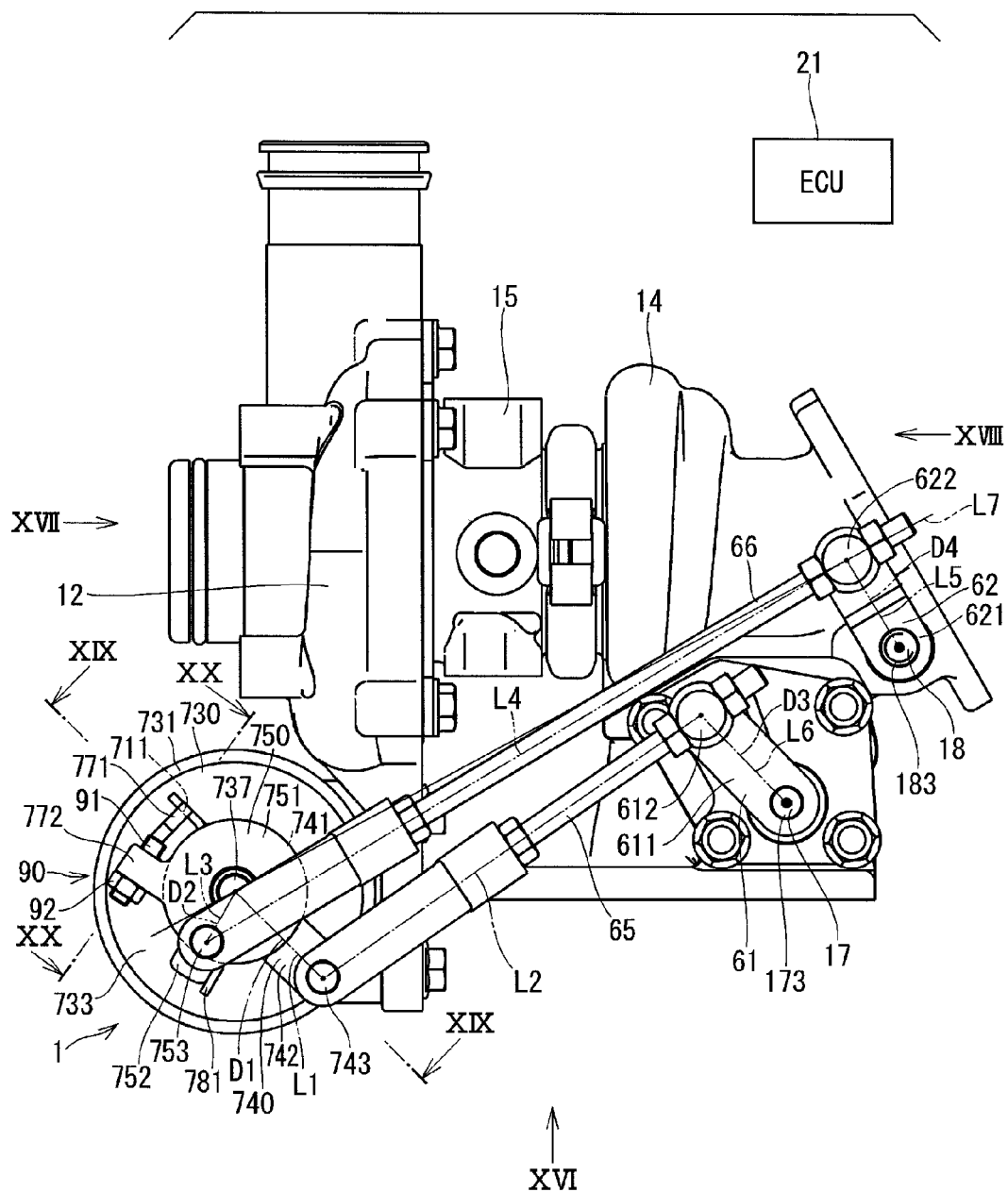
FIG. 15 is a schematic diagram showing a valve drive apparatus and a supercharger according to a ninth embodiment of the present disclosure.

As shown in FIG. 15, the valve drive apparatus 1 of the present embodiment includes an actuator 730, a first drive lever 740, a second drive lever 750, a first valve lever 61, a second valve lever 62, a first rod 65, a second rod 66, a first predetermined shape portion 771, a second predetermined shape portion 772, a spring (serving as an urging device and a resilient member) 781, and a gap forming portion 90.

Figure 16:
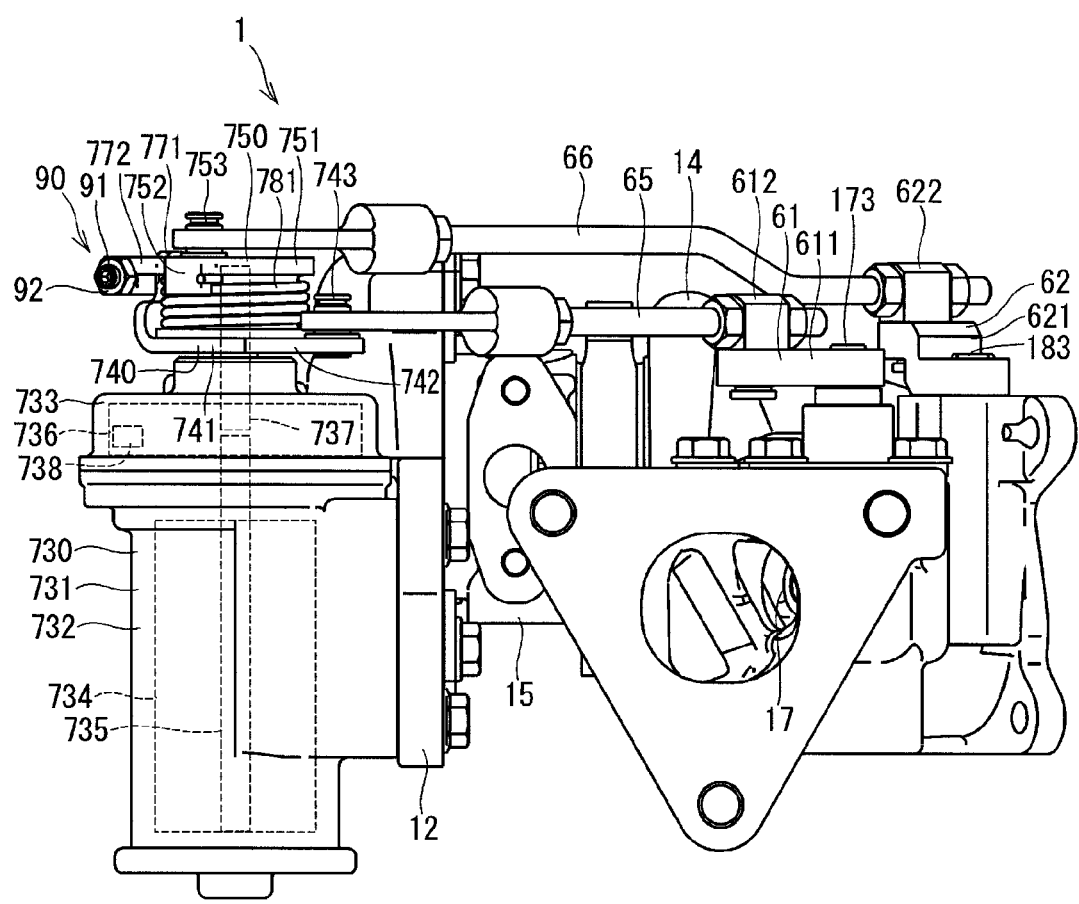
FIG. 16 is a view taken in a direction of an arrow XVI in FIG. 15.
Figure 17:
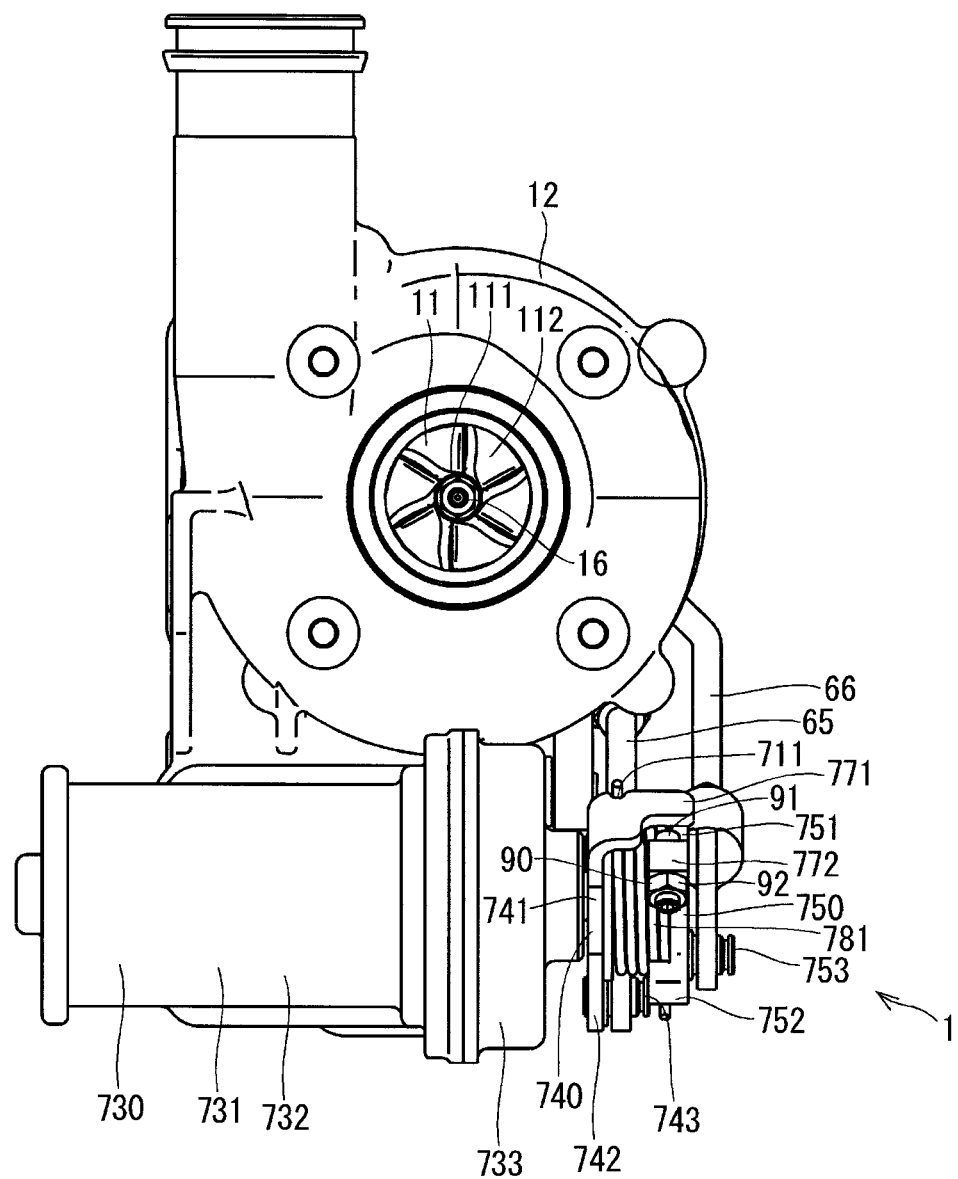
FIG. 17 is a view taken in a direction of an arrow XVII in FIG. 15.
Figure 18:
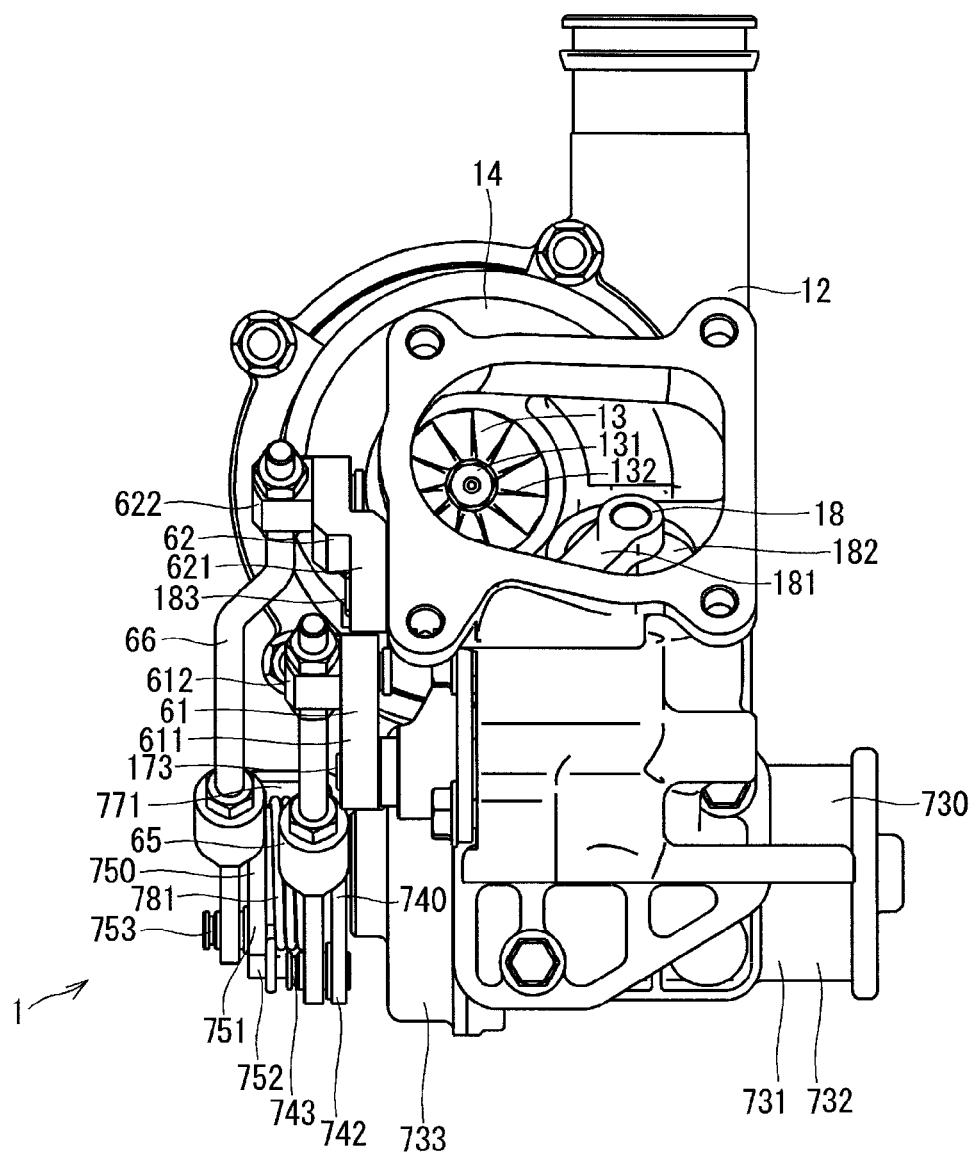
FIG. 18 is a view taken in a direction of an arrow XVIII in FIG. 15.

As shown in FIG. 16, the actuator 730 includes a housing 731, an electric motor (hereinafter referred to as a motor) 734, a gear member 736, an output shaft 737, and a rotational position sensor 738.

The housing 731 is made of, for example, metal and includes a tubular portion 732 and a cover portion 733. The tubular portion 732 is configured into a cup form. The cover portion 733 is configured into a cup form and has an opening, which contacts an opening of the tubular portion 732.

The motor 734 is received in the tubular portion 732. The motor 734 includes a stator and a rotor (not shown). A motor shaft 735 is placed in a rotational center of the rotor. When an electric power is supplied to the motor 734, the rotor and the motor shaft 735 are rotated.

The gear member 736 is placed in the inside of the cover portion 733 such that the gear member 736 is connected to the motor shaft 735. One end part of the output shaft 737 is connected to the gear member 736, and the other end part of the output shaft 737 is exposed to the outside of the cover portion 733. An axis of the output shaft 737 is parallel to an axis of the motor shaft 735. The output shaft 737 is rotatably supported by the cover portion 733.

A rotational speed of the rotation, which is outputted from the motor 734 (the motor shaft 735), is reduced through the gear member 736, and the rotation of the reduced rotational speed is outputted through the output shaft 737. The rotational position sensor 738 is provided in the gear member 736. The rotational position sensor 738 outputs a signal, which indicates a relative rotational position between the output shaft 737 and the cover portion 733, to the ECU 21. In this way, the ECU 21 can sense the rotational position of the output shaft 737. The ECU 21 adjusts the electric power, which is supplied to the motor 734, based on the signal of the rotational position sensor 738 and the other information to control the rotation of the motor 734. Thereby, the rotation of the output shaft 737 is controlled.

The actuator 730 is installed to the supercharger 3 such that the housing 731 is fixed to the compressor housing 12.

Figure 19:
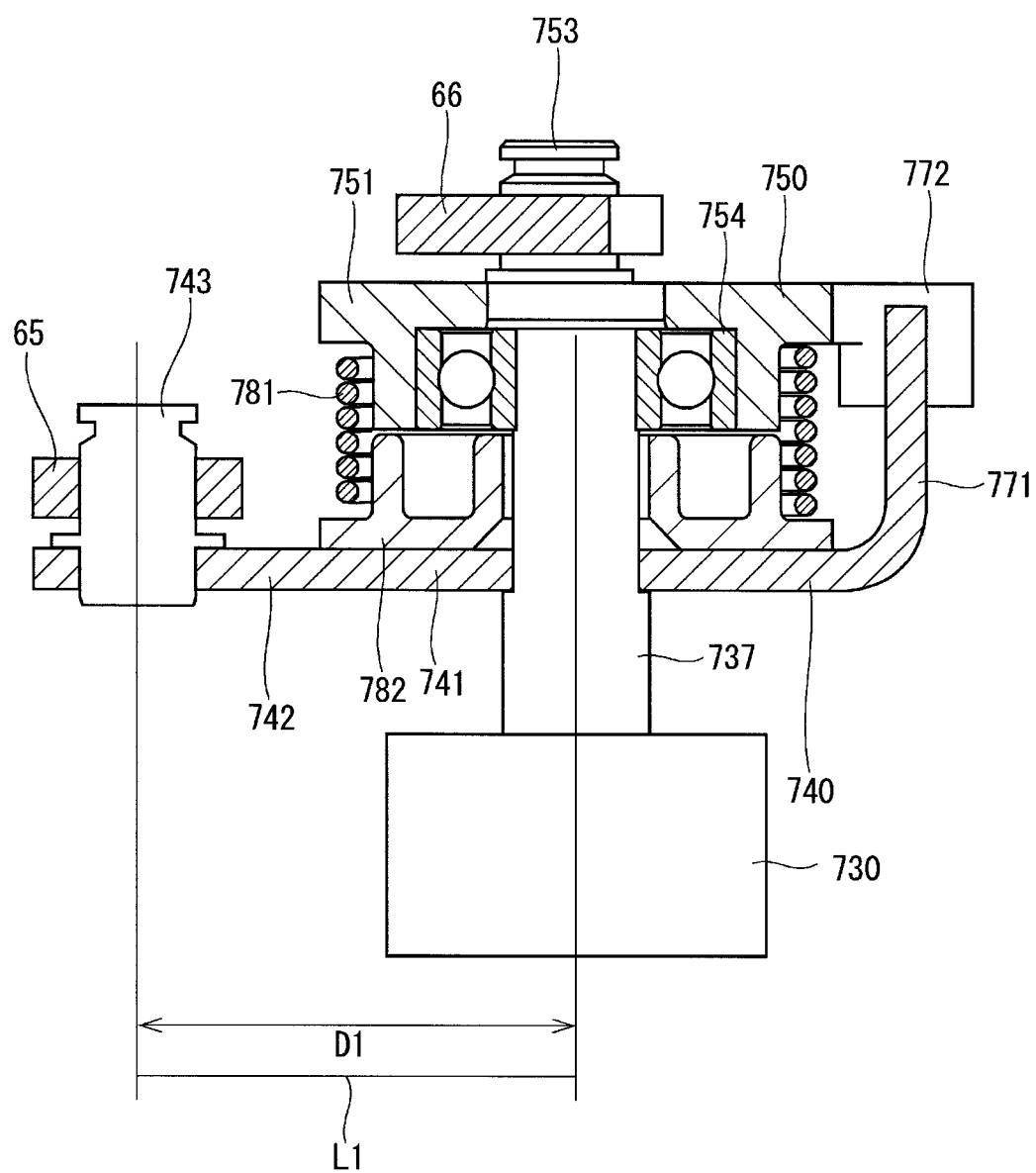
FIG. 19 is a cross-sectional view taken along line XIX-XIX in FIG. 15.

The first drive lever 740 is made of, for example, metal and is placed on an opposite side of the cover portion 733, which is opposite from the tubular portion 732. The first drive lever 740 includes a main body 741, a projection 742, and a first drive lever shaft 743. The main body 741 is configured into, for example, a generally circular disk plate form and is generally parallel to a bottom surface of the cover portion 733. As shown in FIG. 19, a hole is formed in a center of the main body 741, and the output shaft 737 is fitted into this hole. In this way, the main body 741 (the first drive lever 740) can rotate integrally with the output shaft 737. The projection 742 radially outwardly projects from an outer peripheral part of the main body 741.

The first drive lever shaft 743 is made of, for example, metal and is configured into a generally cylindrical tubular form. The first drive lever shaft 743 is placed on an opposite side of the projection 742, which is opposite from the main body 741. An axis of the first drive lever shaft 743 is parallel to the axis of the output shaft 737 and is placed at a location that is spaced from the axis of the output shaft 737 by a first predetermined distance D1 (see FIGS. 15 and 19).

The second drive lever 750 is made of, for example, metal and is placed on an opposite side of the first drive lever 740, which is opposite from the cover portion 733. The second drive lever 750 includes a main body 751, an engaging part 752 and a second drive lever shaft 753. The main body 751 is configured into, for example, a generally circular disk plate form and is generally parallel to the main body 741 of the first drive lever 740. As shown in FIG. 19, a hole is formed in a center of the main body 751, and a bearing 754 is placed in this hole. The end part of the output shaft 737 is fitted into the bearing 754. In this way, the main body 751 (the second drive lever 750) can rotate relative to the output shaft 737 and the first drive lever 740. The engaging part 752 radially outwardly projects from an outer peripheral edge part of the main body 751 and extends toward the first drive lever 740.

The second drive lever shaft 753 is made of, for example, metal and is configured into a generally cylindrical tubular form. The second drive lever shaft 753 is placed at the outer peripheral edge part of the main body 751. An axis of the second drive lever shaft 753 is parallel to the axis of the output shaft 737 and is placed at a location, which is spaced from the axis of the output shaft 737 by a second predetermined distance D2 (see FIG. 15).

The first drive lever 740 and the second drive lever 750 are placed one after another in an axial direction of the output shaft 737.

As shown in FIG. 15, the first valve lever 61 includes a main body 611 and a first valve lever shaft 612. The main body 611 is made of, for example, metal and is configured into an elongated plate form. One end part of the main body 611 is fixed to the first valve shaft 173. A plate thickness direction of the main body 611 (i.e., a direction perpendicular to a plane of the main body 611) is generally parallel to the axis of the first valve shaft 173. In this way, the main body 611 (the first valve lever 61) can rotate integrally with the first valve shaft 173. Thus, when the main body 611 is rotated integrally with the first valve shaft 173, the first valve 17 is opened or closed.

The first valve lever shaft 612 is made of, for example, metal and is configured into a generally cylindrical tubular form. The first valve lever shaft 612 is placed at the other end part of the main body 611. An axis of the first valve lever shaft 612 is parallel to the axis of the first valve shaft 173 and is placed at a location, which is spaced from the axis of the first valve shaft 173 by a third predetermined distance D3.

As shown in FIG. 15, the second valve lever 62 includes a main body 621 and a second valve lever shaft 622. The main body 621 is made of, for example, metal and is configured into an elongated plate form. One end part of the main body 621 is fixed to the second valve shaft 183. A plate thickness direction of the main body 621 (i.e., a direction perpendicular to a plane of the main body 621) is generally parallel to the axis of the second valve shaft 183. In this way, the main body 621 (the second valve lever 62) can rotate integrally with the second valve shaft 183. Thus, when the main body 621 is rotated integrally with the second valve shaft 183, the second valve 18 is opened or closed.

The second valve lever shaft 622 is made of, for example, metal and is configured into a generally cylindrical tubular form. The second valve lever shaft 622 is placed at the other end part of the main body 621. An axis of the second valve lever shaft 622 is parallel to the axis of the second valve shaft 183 and is placed at a location, which is spaced from the axis of the second valve shaft 183 by a fourth predetermined distance D4.

The first rod 65 is made of, for example, metal and is configured into a rod form. The first rod 65 is rotatably connected to the first drive lever shaft 743 at one end part of the first rod 65 and is rotatably connected to the first valve lever shaft 612 at the other end part of the first rod 65, which is opposite from the one end part of the first rod 65.

The second rod 66 is made of, for example, metal and is configured into a rod form. The second rod 66 is rotatably connected to the second drive lever shaft 753 at one end part of the second rod 66 and is rotatably connected to the second valve lever shaft 622 at the other end part of the second rod 66, which is opposite from the one end part of the second rod 66.

The first predetermined shape portion 771 is formed integrally with the main body 741 such that the first predetermined shape portion 771 radially outwardly projects from an outer peripheral edge part of the main body 741 of the first drive lever 740. The first predetermined shape portion 771 is formed at a corresponding location of the first drive lever 740, which is spaced from the axis of the output shaft 737 by a predetermined distance.

As shown in FIG. 19, in the present embodiment, a cross section of the first predetermined shape portion 771 is configured into an L-shape. That is, the first predetermined shape portion 771 is formed by bending a member, which forms the main body 741. An engaging part 711 is formed in the first predetermined shape portion 771.

The second predetermined shape portion 772 is formed integrally with the main body 751 such that the second predetermined shape portion 772 radially outwardly projects from an outer peripheral edge part of the main body 751 of the second drive lever 750. The second predetermined shape portion 772 is formed at a corresponding location of the second drive lever 750, which is spaced from the axis of the output shaft 737 by a predetermined distance.

The second predetermined shape portion 772 contacts the first predetermined shape portion 771 through relative rotation between the first drive lever 740 and the second drive lever 750.

The spring 781 is made of a resilient member that is made of, for example, metal. The spring 781 is configured into a coil form. That is, as shown in FIG. 19, the spring 781 is a coil spring and is placed between the main body 741 of the first drive lever 740 and the main body 751 of the second drive lever 750 such that the axis of the spring 781 is generally parallel to the axis of the output shaft 737. The spring 781 has one end part, which is engaged with the engaging part 711 of the first predetermined shape portion 771, and the other end part, which is engaged with the engaging part 752 of the second drive lever 750 (see FIGS. 15, 16, and 20). The spring 781 has a predetermined modulus of elasticity. Furthermore, the spring 781 urges the first drive lever 740 and the second drive lever 750 to move the first predetermined shape portion 771 and the second predetermined shape portion 772 toward each other. In the present embodiment, a spacer 782, which is annular, is placed on a radially inner side of the spring 781. In this way, collapsing of the spring 781 is limited.

Figure 20:
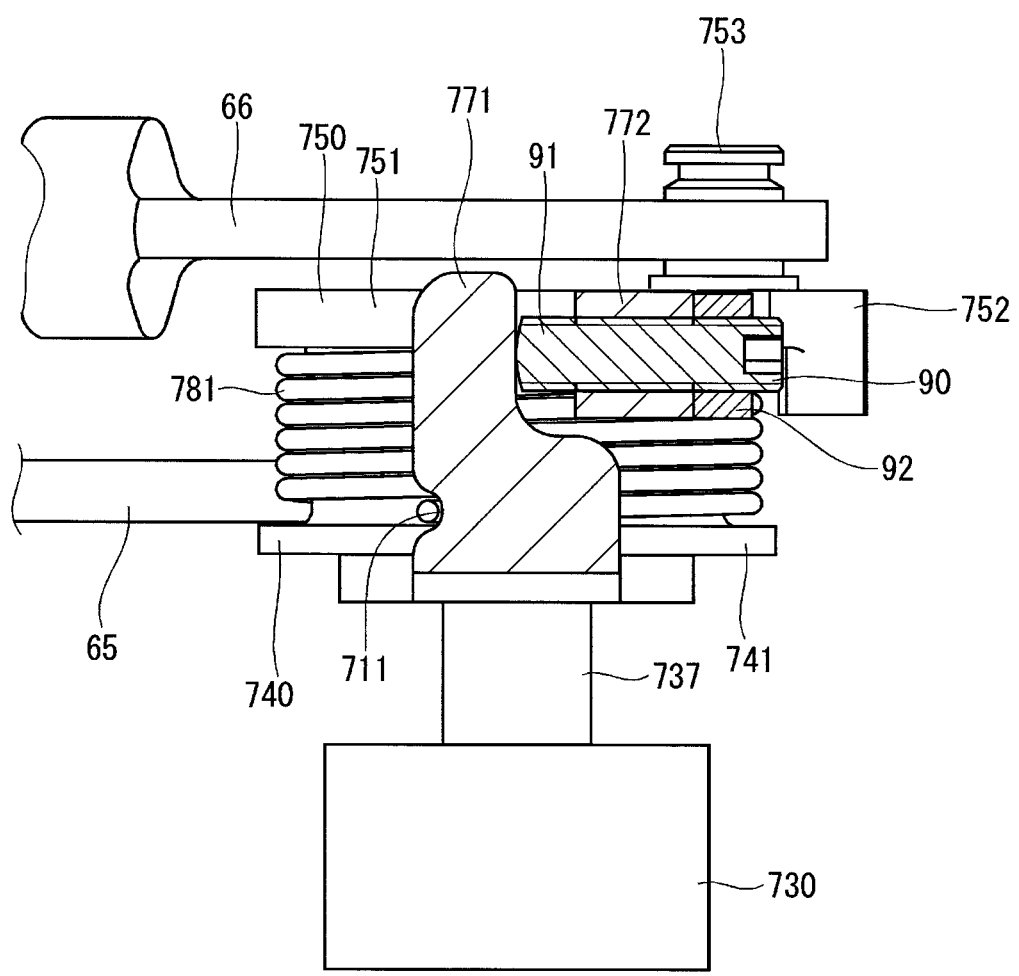
FIG. 20 is a cross-sectional view taken along line XX-XX in FIG. 15.

The gap forming portion 90 is made of, for example, metal and is placed at the second predetermined shape portion 772. As shown in FIGS. 15 and 20, the gap forming portion 90 includes a screw part 91 and a nut 92. The screw part 91 is configured into a generally cylindrical rod form and has a male thread in an outer peripheral wall of the screw part 91. The screw part 91 is threaded into a threaded hole, which is formed in the second predetermined shape portion 772 and has a female thread formed in an inner peripheral wall of the threaded hole. When the screw part 91 is threaded into the threaded hole of the second predetermined shape portion 772, the screw part 91 projects from the second predetermined shape portion 772 by a predetermined amount toward the first predetermined shape portion 771. The amount of projection of the screw part 91 from the second predetermined shape portion 772 toward the first predetermined shape portion 771 can be adjusted by adjusting the amount of insertion of the screw part 91 into the threaded hole of the second predetermined shape portion 772.

The nut 92 is configured into an annular form and has a female thread, which corresponds to the male thread of the screw part 91, in an inner peripheral wall of the nut 92. The nut 92 is threadably installed to the screw part 91 from an end of the screw part 91, which is opposite from the first predetermined shape portion 771, such that the nut 92 contacts the second predetermined shape portion 772. In this way, the screw part 91 is non-displaceably held relative to the second predetermined shape portion 772.

Figure 21A:
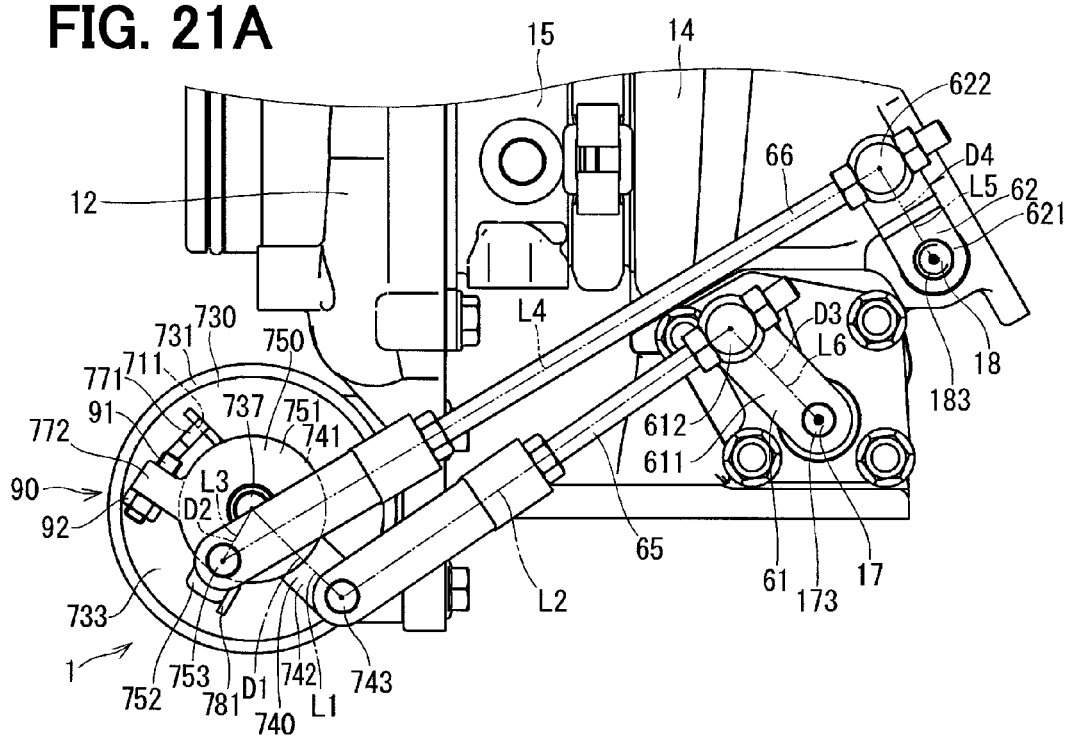
FIG. 21A is a diagram showing a valve closed state of a first valve and a valve closed state of a second valve according to the ninth embodiment.
Figure 21B:
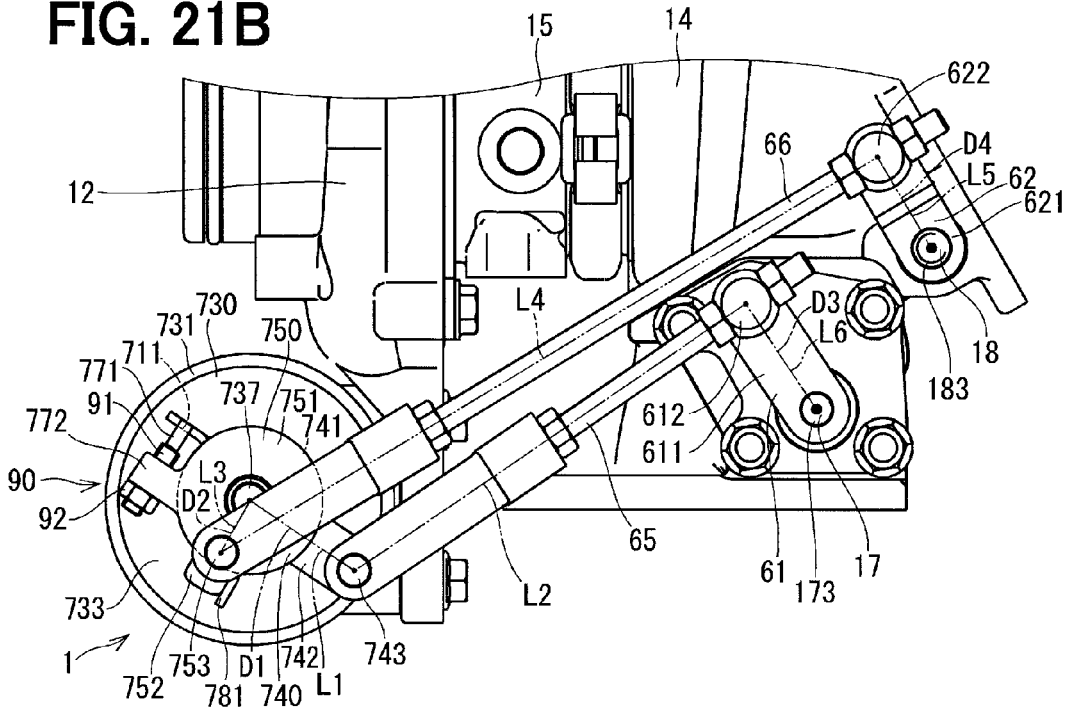
FIG. 21B is a diagram showing an operational state where an actuator is rotated for a predetermined amount from an operational state shown in FIG. 21A.

As shown in FIGS. 15 and 21A, in the state where the first valve 17 and the second valve 18 are both held in the valve closed state (the fully closed state), the screw part 91 and the first predetermined shape portion 771 are spaced from each other. In contrast, as shown in FIG. 21B, in the state where the second valve 18 is held in the valve closed state (the fully closed state), when the first valve 17 is opened for a predetermined amount, the screw part 91 and the first predetermined shape portion 771 contact with each other. At this time, a predetermined gap is formed between the first predetermined shape portion 771 and the second predetermined shape portion 772.

In the present embodiment, as shown in FIG. 15, the second drive lever 750 and the second valve lever 62 are formed such that the second predetermined distance D2 is set to be smaller than the fourth predetermined distance D4. That is, the second drive lever 750 and the second valve lever 62 are formed to satisfy the relationship of D2<D4. The first drive lever 740 and the first valve lever 61 are formed such that the first predetermined distance D1 and the third predetermined distance D3 are set to be generally equal to each other. That is, the first drive lever 740 and the first valve lever 61 are formed to satisfy the relationship of D1≈D3.

As discussed above, in the present embodiment, the first drive lever 740, the first rod 65, the first valve lever 61, the second drive lever 750, the second rod 66, and the second valve lever 62 form a link mechanism (four-bar linkage). When the first drive lever 740 and the second drive lever 750 are rotated through the operation of the actuator 730, the rotation of the first drive lever 740 and the rotation of the second drive lever 750 are conducted to the first valve 17 and the second valve 18, respectively, to open or close the first valve 17 and the second valve 18.

Next, the operation of the valve drive apparatus 1 of the present embodiment will be described with reference to FIGS. 21A to 22B.

As shown in FIG. 21A, in the state where the first valve 17 and the second valve 18 are both held in the valve closed state (the fully closed state), the first predetermined shape portion 771 and the screw part 91 are spaced from each other. The rotational angle of the output shaft 737, i.e., the angle (rotational angle) of the actuator 730 in this state is denoted as a first angle θ1. At this time, the urging force of the spring 781 is exerted against the second valve 18 through the second drive lever 750, the second rod 66, and the second valve lever 62 to urge the second valve 18 in the valve closing direction. In this way, the fully closed state of the second valve 18 is maintained. Furthermore, at this time, the urging force of the spring 781 is exerted against the first drive lever 740 (the output shaft 737).

Furthermore, in the valve closed state of the second valve 18, the first drive lever 740 can be rotated while receiving the urging force of the spring 781 through a corresponding rotational range that is from a position, at which the first valve 17 is closed (see FIG. 21A), to a position, at which the first predetermined shape portion 771 and the screw part 91 contact with each other (see FIG. 21B).

In the state of FIG. 21A, when the ECU 21 drives the actuator 730 to rotate the first drive lever 740 in the direction of opening the first valve 17, the first predetermined shape portion 771 is moved toward the second predetermined shape portion 772 (the gap forming portion 90).

Furthermore, when the ECU 21 drives the actuator 730 to further rotate the first drive lever 740, the first predetermined shape portion 771 contacts the screw part 91 of the gap forming portion 90 (see FIG. 21B). The angle of the actuator 730 in this state is denoted as a second angle θ2. At this time, the first valve 17 is held in the state where the first valve 17 is opened for a predetermined amount, and the second valve 18 is held in the valve closed state (the fully closed state).

Furthermore, when the ECU 21 drives the actuator 730 to further rotate the first drive lever 740, the second drive lever 750 is rotated together with the first drive lever 740 while the first predetermined shape portion 771 and the screw part 91 contact with each other. In this way, the second valve 18 is opened. At this time, the urging force of the spring 781 is canceled between the first drive lever 740 and the second drive lever 750 through contact between the first predetermined shape portion 771 and the screw part 91. Therefore, the urging force of the spring 781 is not exerted against output shaft 737 of the actuator 730.

Furthermore, when the ECU 21 drives the actuator 730 to further rotate the first drive lever 740 (and the second drive lever 750), the projection 742 of the first drive lever 740 and the first rod 65 are aligned and are placed to extend along a straight line. That is, a first straight line L1, which is perpendicular to the axis of the output shaft 737 and the axis of the first drive lever shaft 743, and a second straight line L2, which is perpendicular to the axis of the first drive lever shaft 743 and the axis of the first valve lever shaft 612, overlap with each other along a common straight line (see FIG. 22A). The angle of the actuator 730 in this state is denoted as a third angle θ3. In this state, the opening degree of the first valve 17 is a maximum opening degree of the first valve 17 (see FIG. 23A).

When the ECU 21 drives the actuator 730 to further rotate the first drive lever 740 (and the second drive lever 750), the first valve 17 is moved in the valve closing direction (reducing the opening degree of the first valve 17), and the second valve 18 is moved in the valve opening direction (increasing the opening degree of the second valve 18).

Figure 22A:
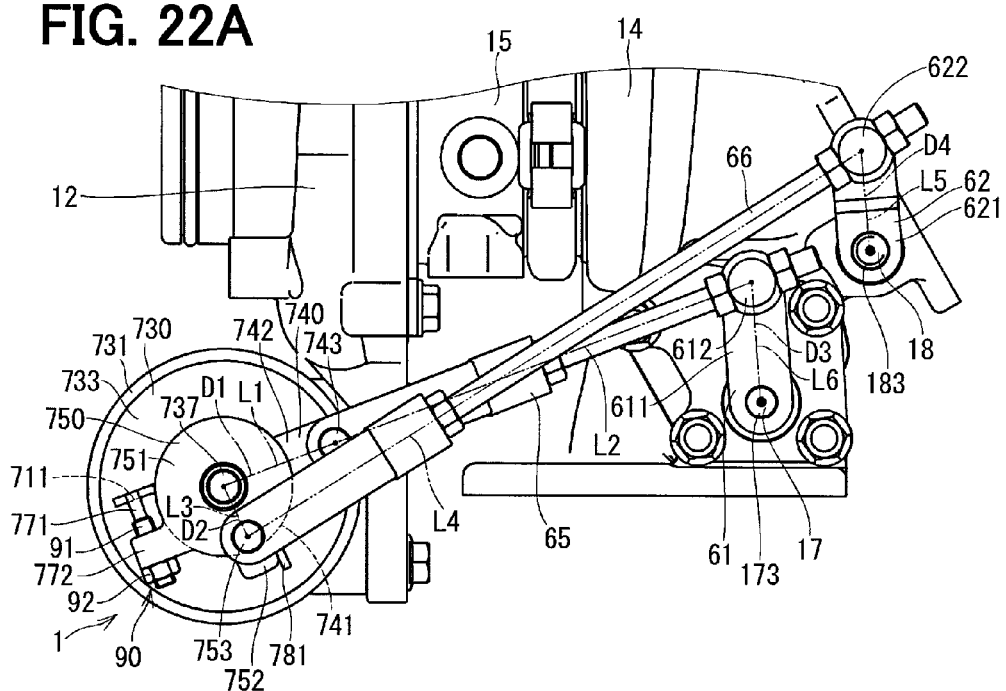
FIG. 22A is a diagram showing an operational state where the actuator is rotated for a predetermined amount from the operational state shown in FIG. 21B.
Figure 22B:
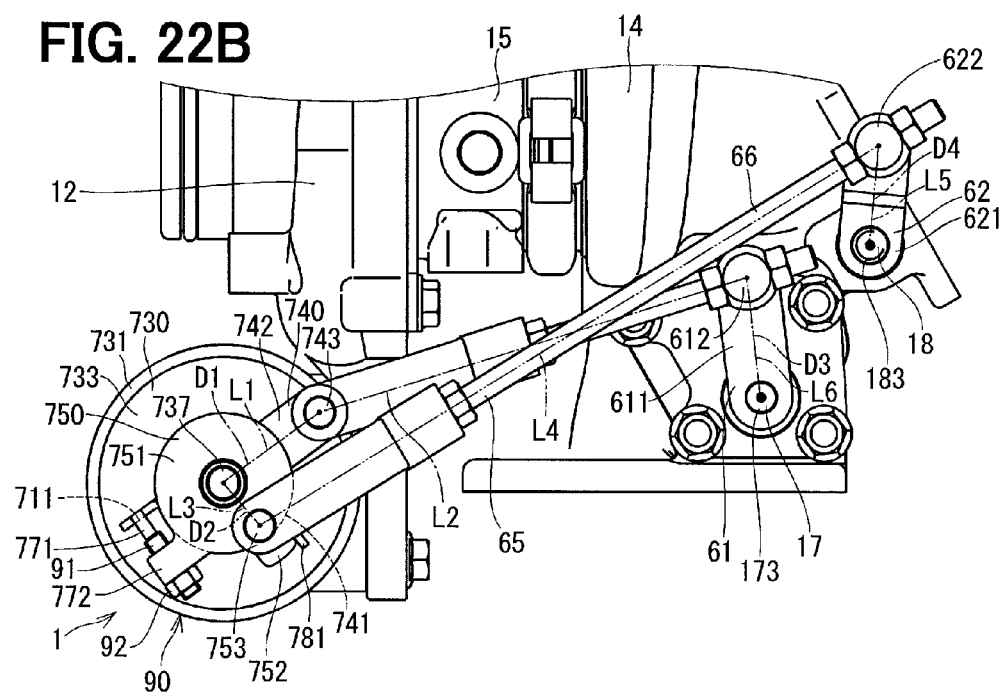
FIG. 22B is a diagram showing an operational state where the actuator is rotated for a predetermined amount from the operational state shown in FIG. 22A.

The actuator 730 can drive the first drive lever 740 and the second drive lever 750 until each of the first drive lever 740 and the second drive lever 750 is placed in a corresponding position show in FIG. 22B. The angle of the actuator 730 in the state shown in FIG. 22B is denoted as a fourth angle θ4. In this state, the opening degree of the second valve 18 is a maximum opening degree of the second valve 18 (see FIG. 23A).

Figure 23A:
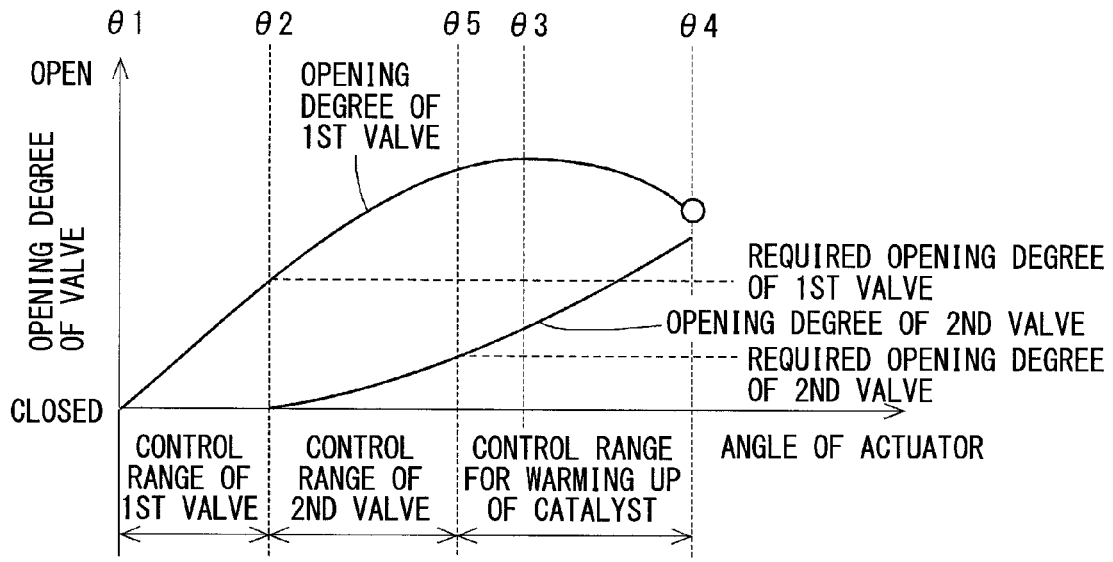
FIG. 23A is a diagram showing a relationship between an angle of the actuator and opening degrees of the first and second valves.

As shown in FIG. 23A, in the present embodiment, when the angle of the actuator 730 is the second angle θ2, the opening degree of the first valve 17 is the required opening degree. The required opening degree is a minimum opening degree, at which a flow rate of the fluid passing through the valve no longer changes.

Furthermore, when the angle of the actuator 730 is a fifth angle θ5, which is between the second angle θ2 and the third angle θ3, the opening degree of the second valve 18 becomes a required opening degree (see FIG. 23A).

That is, in the present embodiment, a range from the first angle θ1 to the second angle θ2 is set as a substantial control range of the first valve 17, and a range from the second angle θ2 to the fifth angle θ5 is set as a substantial control range of the second valve 18. Furthermore, a range from the fifth angle θ5 to the fourth angle θ4 is a control range for warming up of the catalyst of the exhaust emission purifier 9.

Furthermore, in the present embodiment, as shown in FIG. 23A, at the time of holding the actuator 730 at the maximum opening degree thereof, i.e., the fourth angle θ4, the first valve 17 has an opening degree, which is equal to or larger than the required opening degree of the first valve 17.

Figure 23B:
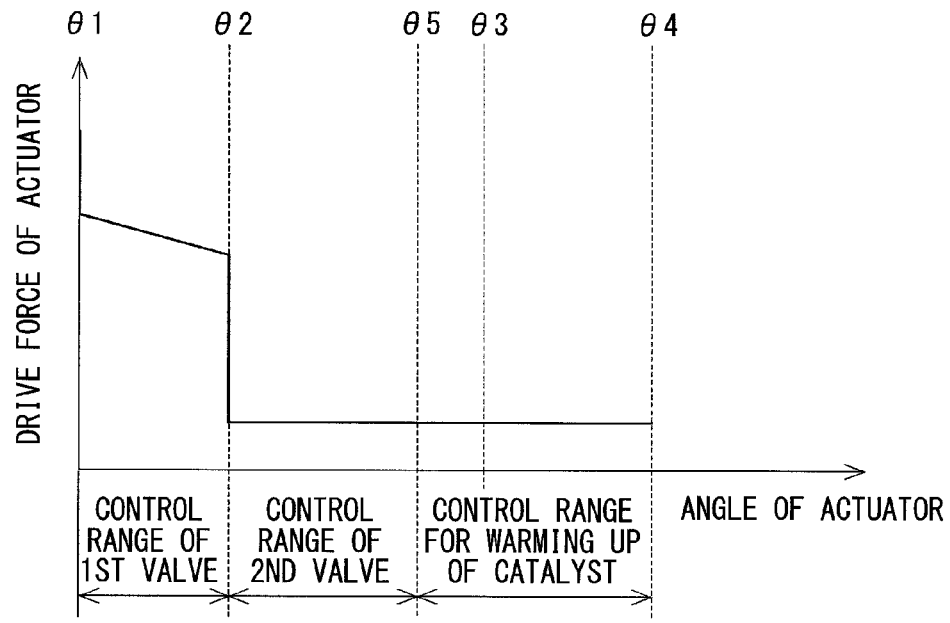
FIG. 23B is a diagram showing a relationship between the angle of the actuator and a drive force of the actuator.

Furthermore, as shown in FIG. 23B, in the range (the control range of the first valve 17) from the first angle θ1 to the second angle θ2 of the actuator 730, the load, which is exerted against the actuator 730, is obtained by subtracting the valve driving force of the exhaust gas pulsation (exerted in the valve opening direction) from the generated torque of the spring 781 (exerted in the valve closing direction). In the range from the second angle θ2 to the fourth angle θ4 of the actuator 730, the load, which is exerted against the actuator 730, is only a valve driving force of the exhaust gas pulsation (exerted in the valve opening direction).

Furthermore, in the present embodiment, when the angle of the actuator 730 is the third angle θ3, the first straight line L1 and the second straight line L2 overlap with each other along the common straight line (see FIG. 22A), and the opening degree of the first valve 17 is the maximum opening degree. That is, the rotatable range of the first drive lever 740 includes the predetermined rotational position where the first straight line L1, which is perpendicular to the axis of the output shaft 737 and the axis of the first drive lever shaft 743, and the second straight line L2, which is perpendicular to the axis of the first drive lever shaft 743 and the axis of the first valve lever shaft 612, overlap with each other along the common straight line.

Furthermore, in the present embodiment, as shown in FIG. 15, the second drive lever 750, the second rod 66, and the second valve lever 62 are arranged to satisfy all of the following conditions upon placement of the second valve 18 in the valve closed state (the fully closed state): an angle between a third straight line L3, which is perpendicular to the axis of the output shaft 737 and the axis of the second drive lever shaft 753, and a fourth straight line L4, which is perpendicular to the axis of the second drive lever shaft 753 and the axis of the second valve lever shaft 622, is an acute angle; and an angle between a fifth straight line L5, which is perpendicular to the axis of the second valve lever shaft 622 and the axis of the second valve shaft 183, and the fourth straight line L4 is a right angle. In this description, the term, "right angle" is not necessarily limited to the precise angle of 90 degrees but may include a generally right angle (e.g., 89 degrees, 91 degrees).

The first drive lever 740, the first rod 65, and the first valve lever 61 are arranged to satisfy all of the following conditions upon placement of the first valve 17 in the valve closed state (the fully closed state) shown in FIG. 15: an angle between the first straight line L1 and the second straight line L2 is an obtuse angle; and an angle between a sixth straight line L6, which is perpendicular to the axis of the first valve lever shaft 612 and the axis of the first valve shaft 173, and the second straight line L2 is an obtuse angle.

As discussed above, in the present embodiment, when the first valve 17 is in the fully closed state, the predetermined gap is formed between the first predetermined shape portion 771 and the second predetermined shape portion 772 (the gap forming portion 90). In this way, the second valve 18 can be held in the valve closed state by urging the second valve 18 with the spring 781 until the first valve 17 is opened to the predetermined opening degree or larger. Thus, the first valve 17 (the change valve) can be driven within the predetermined range while the second valve 18 (the waste gate valve) is held in the fully closed state with the urging force of the spring 781. When the first valve 17 is opened to the predetermined opening degree or larger, the first predetermined shape portion 771 and the gap forming portion 90 (the screw part 91) contact with each other, and the second valve 18 is opened synchronously with the first valve 17 through the second valve lever 62, the second rod 66, the second drive lever 750, the first drive lever 740, the first rod 65, and the first valve lever 61.

As discussed above, according to the present embodiment, the link mechanism is formed with the fewer number of the constituent members, and the two valves (the first valve 17 and the second valve 18) can be driven by the single actuator 730. Therefore, the costs of the constituent members of the valve drive apparatus 1 and the manufacturing costs of the valve drive apparatus 1 can be reduced.

Furthermore, in the present embodiment, the distance between the output shaft 737 and the first drive lever shaft 743, the distance between the output shaft 737 and the second drive lever shaft 753, the distance between the first valve shaft 173 and the first valve lever shaft 612, and the distance between the second valve shaft 183 and the second valve lever shaft 622, i.e., the first to fourth distances D1-D4 are appropriately set to enable the adjustment of the transmission efficiency of the drive force of the actuator 730 to the first valve 17 and the second valve 18. Therefore, the drive force of the actuator 730 can be efficiently transmitted to the first valve 17 and the second valve 18.

Furthermore, in the present embodiment, in the closed state of the second valve 18, when the first valve 17 is driven, the urging force of the spring 781 is exerted against the output shaft 737 of the actuator 730 through the first drive lever 740. At this time, the load of the actuator 730 becomes large. In contrast, when the second valve 18 is opened, i.e., when the second valve 18 is driven together with the first valve 17, the urging force of the spring 781 is canceled between the first drive lever 740 and the second drive lever 750 through contact between the first predetermined shape portion 771 and the gap forming portion 90 (the screw part 91). Therefore, the urging force of the spring 781 is not exerted against the output shaft 737 of the actuator 730. Thus, in the case where the second valve 18 is mainly opened as the operation of the engine 2, the load of the actuator 730 is reduced, and thereby the stress on the actuator 730 can be reduced.

The relationship between the rotational speed of the engine 2 and the BMEP or the torque of the present embodiment is similar to the one discussed with reference to FIG. 8 in the first embodiment. That is, the operational range of the engine 2 is substantially in the valve opening control range of the second valve 18. Therefore, even in the present embodiment, the stress of the actuator 730 can be reduced substantially in the entire operational range of the engine 2. Therefore, the lifetime of the actuator 730 and its peripheral members can be lengthened. Furthermore, in the present embodiment, the actuator 730 is the electric actuator. Therefore, the electric power consumption can be reduced.

Also, in the present embodiment, the spring 781 is made of the resilient member, which has the predetermined modulus of elasticity. Furthermore, the one end part of the spring 781 is engaged with the engaging part 711 of the first predetermined shape portion 771, and the other end part of the spring 781 is engaged with the engaging part 752 of the second drive lever 750. In this way, the first valve 17 can be driven within the predetermined range while maintaining the fully closed state of the second valve 18 with the urging force of the spring 781. The actuator 730 is installed to the compressor housing 12. Therefore, it is possible to limit the increasing of the temperature of the spring 781 to the high temperature with the heat of the exhaust gas. Thus, the spring 781 can be made of the low cost member, which has the relatively low heat resistance.

Furthermore, in the preset embodiment, the first drive lever 740 and the first valve lever 61 are formed such that the first predetermined distance D1 and the third predetermined distance D3 are generally equal to each other. In addition, the first drive lever 740, the first rod 65, and the first valve lever 61 are arranged to satisfy all of the following conditions upon placement of the first valve 17 in the valve closed state (the fully closed state): the angle between the first straight line L1 and the second straight line L2 is the obtuse angle; and the angle between the sixth straight line L6 and the second straight line L2 is the obtuse angle. Therefore, the rotatable range of the first drive lever 740 includes the predetermined rotational position where the first straight line L1 and the second straight line L2 overlap with each other along the common straight line. Thus, when the actuator 730 is rotated in the valve opening direction of the second valve 18, the opening degree of the first valve 17 is reduced after the reaching of the maximum opening degree (the third angle θ3). In this way, the maximum opening degree (the upper limit) of the first valve 17 can be adjusted, and the receiving space (the dead volume) of the first valve 17 in the turbine housing 14 can be reduced or minimized. As a result, it is possible to reduce the size of the turbine housing 14, and it is also possible to limit the increase in the pressure loss and the increase in the heat mass caused by the increase in the dead volume.

Furthermore, in the present embodiment, the second drive lever 750 and the second valve lever 62 are formed such that the second predetermined distance D2 is set to be smaller than the fourth predetermined distance D4. In this way, the torque of the output shaft 737 (the second drive lever 750) can be amplified and can be transmitted to the second valve lever 62 (the second valve 18). Therefore, the drive force of the actuator 730 can be efficiently transmitted to the second valve 18.

Furthermore, in the present embodiment, the second drive lever 750, the second rod 66, and the second valve lever 62 are arranged to satisfy all of the following conditions upon placement of the second valve 18 in the valve closed state (the fully closed state): the angle between the third straight line L3 and the fourth straight line L4 is the acute angle; and the angle between the fifth straight line L5 and the fourth straight line L4 is the right angle. In this way, the torque of the output shaft 737 (the second drive lever 750) can be amplified and can be efficiently transmitted to the second valve lever 62 (the second valve 18).

Furthermore, in the present embodiment, the gap forming portion 90 is formed in and projects from the second predetermined shape portion 772 toward the first predetermined shape portion 771. The gap forming portion 90 forms the predetermined gap between the first predetermined shape portion 771 and the second predetermined shape portion 772 when the gap forming portion 90 contacts the first predetermined shape portion 771. The gap forming portion 90 (the screw part 91) is formed such that the amount of projection of the gap forming portion 90 from the second predetermined shape portion 772 is variable (adjustable). In the present embodiment, the range, which is from the start of the valve opening of the first valve 17 to the start of the valve opening of the second valve 18, is determined by the gap between the first predetermined shape portion 771 and the second predetermined shape portion 772. In the present embodiment, the gap between the first predetermined shape portion 771 and the second predetermined shape portion 772 can be adjusted by the gap forming portion 90. Therefore, by adjusting the variations in the positional relationship between the first drive lever 740 and the second drive lever 750 and the variations in the torque of the spring 781, the control range (the operational range) of the first valve 17 can be accurately determined. Thereby, the tolerances of the components can be increased, and the manufacturing costs can be reduced.

Furthermore, in the preset embodiment, the first drive lever 740 and the second drive lever 750 are placed one after another in the axial direction of the output shaft 737. In addition, the first predetermined shape portion 771 is formed by bending the member, which forms the first drive lever 740 (the main body 741). In this way, the first drive lever 740 and the first predetermined shape portion 771 can be formed from the low cost member (e.g., a press forming material, which is processed through a press forming process).

Tenth Embodiment

Figure 24:
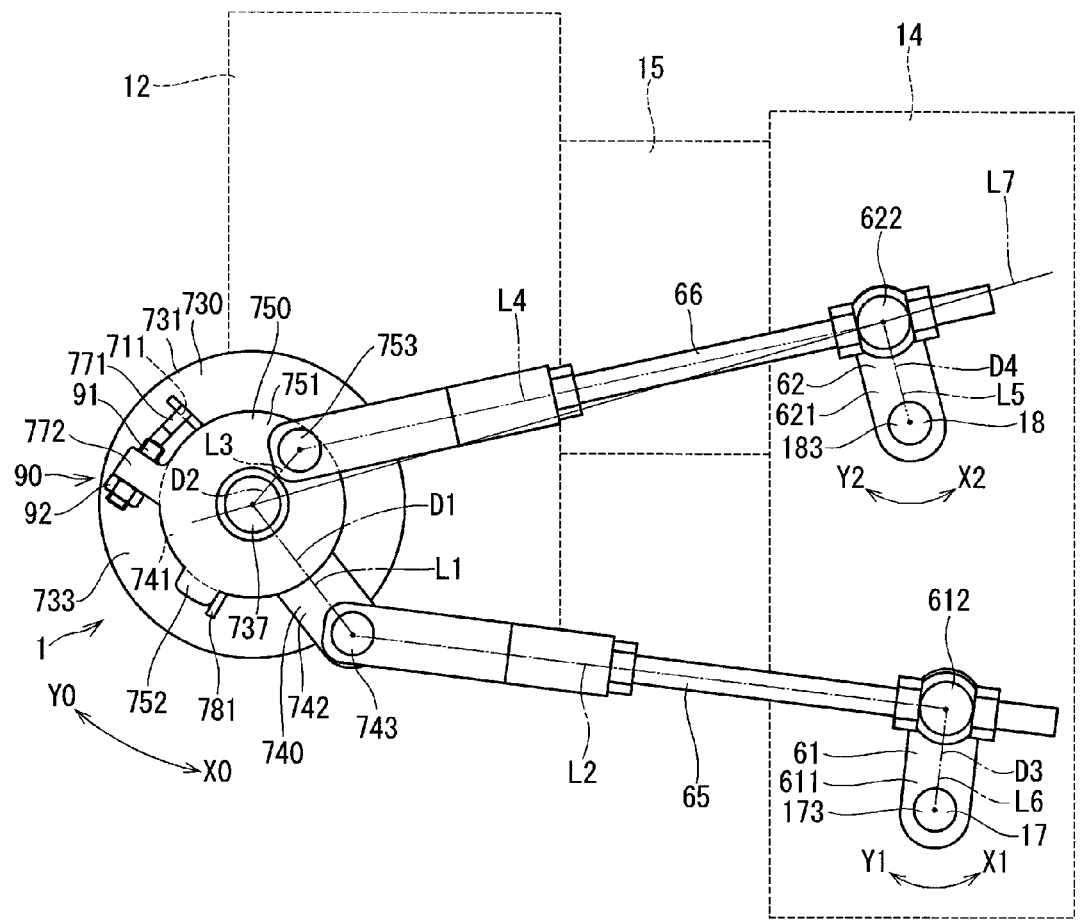
FIG. 24 is a schematic diagram showing a valve drive apparatus according to a tenth embodiment of the present disclosure.

FIG. 24 shows a valve drive apparatus according to a tenth embodiment of the present disclosure. In the tenth embodiment, the arrangement of the first drive lever, the first rod, the first valve lever, the second drive lever, the second rod, and the second valve lever as well as the rotational directions of the second valve shaft at the valve opening time and the valve closing time of the second valve are different from those of the ninth embodiment.

FIG. 24 shows the valve drive apparatus in the state where the first valve 17 and the second valve 18 are both in the fully closed state. In the tenth embodiment, a seventh straight line L7 is perpendicular to the axis of the output shaft 737 and the axis of the second valve lever shaft 622, and the second drive lever shaft 753 is provided to the main body 751 of the second drive lever 750 on an opposite side of the seventh straight line L7, which is opposite from the first drive lever shaft 743. In the ninth embodiment, the second drive lever shaft 753 is provided to the main body 751 of the second drive lever 750 on the other side of the seventh straight line L7 where the first drive lever shaft 743 is located (see FIG. 15). Furthermore, in the tenth embodiment, the second drive lever 750, the second rod 66, and the second valve lever 62 are arranged to satisfy the following condition upon placement of the second valve 18 in the fully closed state: an angle between the third straight line L3 and the fourth straight line L4 is an obtuse angle.

In the tenth embodiment, the first drive lever 740, the first rod 65, the first valve lever 61, the second drive lever 750, the second rod 66, and the second valve lever 62 are arranged to satisfy the following condition upon rotation of the output shaft 737 in one rotational direction or the other rotational direction: the first valve shaft 173 and the second valve shaft 183 are rotated in different rotational directions, respectively, so that the first valve 17 and the second valve 18 are opened or closed.

For example, when the output shaft 737 is rotated in the one rotational direction, i.e., a direction X0 (a counterclockwise direction in FIG. 24), the first valve shaft 173 is rotated in a direction Y1 (a clockwise direction in FIG. 24), so that the first valve 17 is opened. At this time, the first rod 65 is axially compressed by the first drive lever shaft 743 and the first valve lever shaft 612. When the output shaft 737 is further rotated in the direction X0, the first predetermined shape portion 771 and the screw part 91 contact with each other. Thereafter, when the output shaft 737 is further rotated in the direction X0, the second valve shaft 183 is rotated in a direction X2 (the counterclockwise direction in FIG. 24). Thereby, the second valve 18 is opened. At this time, the second rod 66 is axially pulled by the second drive lever shaft 753 and the second valve lever shaft 622.

In the state where the first valve 17 and the second valve 18 are opened, when the output shaft 737 is rotated in the other rotational direction, i.e., a direction Y0 (the clockwise direction in FIG. 24), the first valve shaft 173 is rotated in a direction X1 (the counterclockwise direction). Thereby, the first valve 17 is closed. At this time, the first rod 65 is axially pulled by the first drive lever shaft 743 and the first valve lever shaft 612. Furthermore, at this time, the second valve 18 is rotated in a direction Y2 (the clockwise direction in FIG. 24), so that the second valve 18 is closed. At this time, the second rod 66 is axially compressed by the second drive lever shaft 753 and the second valve lever shaft 622.

As discussed above, in the present embodiment, the first drive lever 740, the first rod 65, the first valve lever 61, the second drive lever 750, the second rod 66, and the second valve lever 62 are arranged to satisfy the following condition upon rotation of the output shaft 737 in the one rotational direction (the direction X0 in FIG. 24) or the other rotational direction (the direction Y0 in FIG. 24): the first valve shaft 173 and the second valve shaft 183 are rotated in the different rotational directions (the clockwise direction or the counterclockwise direction), respectively, so that the first valve 17 and the second valve 18 are opened or closed. That is, even in the case where the valve opening direction and the valve closing direction of the first valve 17 are opposite from the valve opening direction and the valve closing direction, respectively, of the second valve 18, the first valve 17 and the second valve 18 can be opened or closed by rotating the output shaft 737 of the actuator 730 in the one rotational direction or the other rotational direction. Therefore, a design freedom of the turbine housing 14, to which the first valve 17 and the second valve 18 are provided, is increased, and thereby the installability of the valve drive apparatus 1 in the vehicle can be improved.

Furthermore, in the present embodiment, at the time of opening the first valve 17, the first rod 65 is axially compressed by the first drive lever shaft 743 and the first valve lever shaft 612. At the time of closing the first valve 17, the first rod 65 is axially pulled by the first drive lever shaft 743 and the first valve lever shaft 612. Also, at the time of opening the second valve 18, the second rod 66 is axially pulled by the second drive lever shaft 753 and the second valve lever shaft 622. At the time of closing the second valve 18, the second rod 66 is axially compressed by the second drive lever shaft 753 and the second valve lever shaft 622. As discussed above, in the present embodiment, at the time of closing the first valve 17, the first rod 65 is axially pulled by the first drive lever shaft 743 and the first valve lever shaft 612. Therefore, even when a required load for fully closing the first valve 17 is set to a high value, damage of the first rod 65 can be limited. That is, the present embodiment is suitable for the case where the permissible amount of leakage of the first valve 17 is small, and the required load for fully closing the first valve 17 can be set to the high value without inducing the damage of the first rod 65.

In the present embodiment, when the second valve 18 is closed, the second rod 66 is axially compressed by the second drive lever shaft 753 and the second valve lever shaft 622. Therefore, when a required load for fully closing the second valve 18 is set to a high value, the second rod 66 may possibly be collapsed. Thus, in the present embodiment, it is desirable that the required load for fully closing the second valve 18 is set to a small value.

Furthermore, in the embodiment, the second drive lever 750, the second rod 66, and the second valve lever 62 are arranged to satisfy the following condition upon placement of the second valve 18 in the fully closed state: an angle between the third straight line L3 and the fourth straight line L4 is the obtuse angle. When the second valve 18 is rotated from the fully closed state in the valve opening direction (the direction X2), the output shaft 737 is rotated such that the angle between the third straight line L3 and the fourth straight line L4 is changed in the order of the right angle and the acute angle. Therefore, at the time of opening the second valve 18, the torque of the output shaft 737 can be efficiently transmitted to the second valve 18.

Furthermore, in the present embodiment, the second drive lever 750, the second rod 66, and the second valve lever 62 are arranged to satisfy all of the following conditions upon placement of the second valve 18 in the valve closed state (the fully closed state): the angle between the third straight line L3 and the fourth straight line L4 is the obtuse angle; and the angle between the fifth straight line L5 and the fourth straight line L4 is the right angle. In this way, the torque of the output shaft 737 (the second drive lever 750) can be amplified and can be transmitted to the second valve lever 62 (the second valve 18).

Eleventh Embodiment

Figure 25:
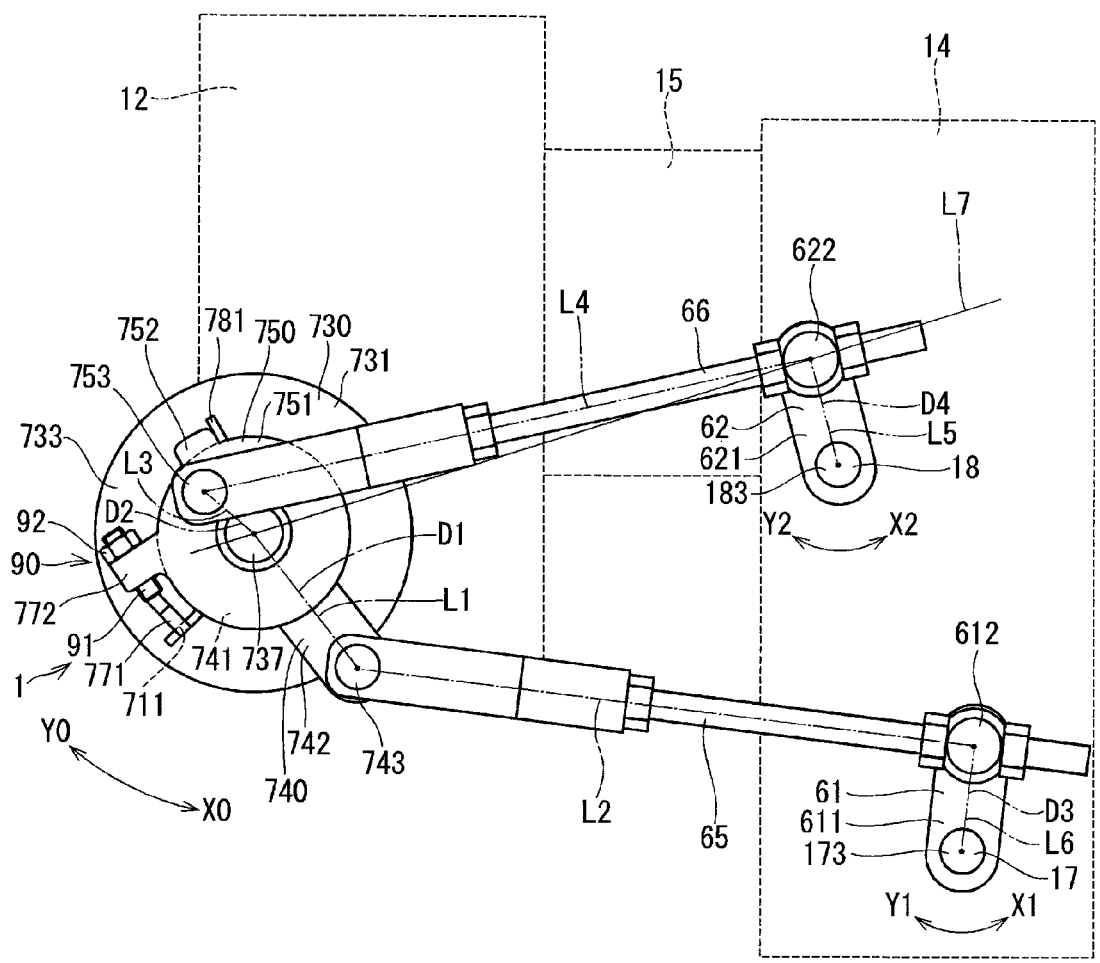
FIG. 25 is a schematic diagram showing a valve drive apparatus according to an eleventh embodiment of the present disclosure.

FIG. 25 shows a valve drive apparatus according to an eleventh embodiment of the present disclosure. In the eleventh embodiment, the arrangement of the second drive lever, the second rod, and the second valve lever, the rotational directions of the first valve shaft at the valve opening time and the valve closing time of the first valve, the rotational directions of the second valve shaft at the valve opening time and the valve closing time of the second valve, and the rotational directions of the output shaft at the valve opening time and the valve closing time of the first valve and the second valve are different from those of the tenth embodiment.

FIG. 25 shows the valve drive apparatus in the state where the first valve 17 and the second valve 18 are both in the fully closed state. In the eleventh embodiment, the second drive lever shaft 753 is provided to the main body 751 of the second drive lever 750 on the side of the seventh straight line L7, which is opposite from the first drive lever shaft 743. Furthermore, in the eleventh embodiment, the second drive lever 750, the second rod 66, and the second valve lever 62 are arranged to satisfy the following condition upon placement of the second valve 18 in the fully closed state: an angle between the third straight line L3 and the fourth straight line L4 is an acute angle.

Furthermore, in the eleventh embodiment, as shown in FIG. 25, the arrangement of the engaging part 752, the first predetermined shape portion 771, the second predetermined shape portion 772, the spring 781, and the gap forming portion 90 is different from that of the tenth embodiment.

In the eleventh embodiment, the first drive lever 740, the first rod 65, the first valve lever 61, the second drive lever 750, the second rod 66, and the second valve lever 62 are arranged to satisfy the following condition upon rotation of the output shaft 737 in the one rotational direction or the other rotational direction: the first valve shaft 173 and the second valve shaft 183 are rotated in the different rotational directions, respectively, so that the first valve 17 and the second valve 18 are opened or closed.

For example, when the output shaft 737 is rotated in the other rotational direction, i.e., the direction Y0 (the clockwise direction in FIG. 25), the first valve shaft 173 is rotated in the direction X1 (the counterclockwise direction in FIG. 25), so that the first valve 17 is opened. At this time, the first rod 65 is axially pulled by the first drive lever shaft 743 and the first valve lever shaft 612. When the output shaft 737 is further rotated in the direction Y0, the first predetermined shape portion 771 and the screw part 91 contact with each other. Thereafter, when the output shaft 737 is further rotated in the direction Y0, the second valve shaft 183 is rotated in the direction Y2 (the clockwise direction in FIG. 25). Thereby, the second valve 18 is opened. At this time, the second rod 66 is axially compressed by the second drive lever shaft 753 and the second valve lever shaft 622.

In the state where the first valve 17 and the second valve 18 are opened, when the output shaft 737 is rotated in the one rotational direction, i.e., the direction X0 (the counterclockwise direction in FIG. 25), the first valve shaft 173 is rotated in the direction Y1 (the clockwise direction). Thereby, the first valve 17 is closed. At this time, the first rod 65 is axially compressed by the first drive lever shaft 743 and the first valve lever shaft 612. Furthermore, at this time, the second valve 18 is rotated in the direction X2 (the counterclockwise direction in FIG. 25), so that the second valve 18 is closed. At this time, the second rod 66 is axially pulled by the second drive lever shaft 753 and the second valve lever shaft 622.

As discussed above, in the present embodiment, the first drive lever 740, the first rod 65, the first valve lever 61, the second drive lever 750, the second rod 66, and the second valve lever 62 are arranged to satisfy the following condition upon rotation of the output shaft 737 in the other rotational direction (the direction Y0 in FIG. 25) or the one rotational direction (the direction X0 in FIG. 25): the first valve shaft 173 and the second valve shaft 183 are rotated in the different rotational directions (the counterclockwise direction or the clockwise direction), respectively, so that the first valve 17 and the second valve 18 are opened or closed. That is, even in the case where the valve opening direction and the valve closing direction of the first valve 17 are opposite from the valve opening direction and the valve closing direction, respectively, of the second valve 18, the first valve 17 and the second valve 18 can be opened or closed by rotating the output shaft 737 of the actuator 730 in the other rotational direction or the one rotational direction. Therefore, similar to the tenth embodiment, the design freedom of the turbine housing 14, to which the first valve 17 and the second valve 18 are provided, is increased, and thereby the installability of the valve drive apparatus 1 in the vehicle can be improved.

Furthermore, in the present embodiment, at the time of opening the first valve 17, the first rod 65 is axially pulled by the first drive lever shaft 743 and the first valve lever shaft 612. At the time of closing the first valve 17, the first rod 65 is axially compressed by the first drive lever shaft 743 and the first valve lever shaft 612. Also, at the time of opening the second valve 18, the second rod 66 is axially compressed by the second drive lever shaft 753 and the second valve lever shaft 622. At the time of closing the second valve 18, the second rod 66 is axially pulled by the second drive lever shaft 753 and the second valve lever shaft 622. As discussed above, in the present embodiment, at the time of closing the second valve 18, the second rod 66 is axially pulled by the second drive lever shaft 753 and the second valve lever shaft 622. Therefore, even when the required load for fully closing the second valve 18 is set to the high value, damage of the second rod 66 can be limited. That is, the present embodiment is suitable for the case where the permissible amount of leakage of the second valve 18 is small, and the required load for fully closing the second valve 18 can be set to the high value without inducing the damage of the second rod 66.

In the present embodiment, when the first valve 17 is closed, the first rod 65 is axially compressed by the first drive lever shaft 743 and the first valve lever shaft 612. Therefore, when a required load for fully closing the first valve 17 is set to a high value, the first rod 65 may possibly be collapsed. Thus, in the present embodiment, it is desirable that the required load for fully closing the first valve 17 is set to a small value.

Furthermore, in the present embodiment, the second drive lever 750, the second rod 66, and the second valve lever 62 are arranged to satisfy the following condition upon placement of the second valve 18 in the fully closed state: an angle between the third straight line L3 and the fourth straight line L4 is an acute angle. When the second valve 18 is rotated from the fully closed state in the valve opening direction (the direction Y2), the output shaft 737 is rotated such that the angle between the third straight line L3 and the fourth straight line L4 is changed in the order of the right angle and the obtuse angle. Therefore, at the time of opening the second valve 18, the torque of the output shaft 737 can be efficiently transmitted to the second valve 18.

Now, modifications of the above embodiments will be described.

In a modification of the first to eleventh embodiments, the first valve may be used as a variable nozzle, which controls the amount of exhaust gas supplied to the turbine, i.e., as a variable nozzle of a variable displacement supercharger. In such a case, the first valve (the variable nozzle) can be driven within the predetermined range by the actuator while maintaining the fully closed state of the second valve (the waste gate valve) with the urging force of the urging device.

In the first to eighth embodiments, the corresponding member (the first member, the second member) includes the tubular portion. In a modification of the above embodiments, the tubular portion is not necessarily continuous in the circumferential direction and may be configured such that a circumferential portion of the tubular portion is cut to provide a circumferentially discontinuous tubular portion having a C-shape cross section.

In the first to eleventh embodiments, the urging device is not limited to the metal coil spring. That is, in a modification of the first to eleventh embodiments, the urging device may be made of a resilient member, which is made of a material different from that of the metal coil spring and has a shape different from that of the metal coil spring.

Furthermore, in a modification of the first to eighth embodiments, the gap forming portion may be formed in any one of the first contact part and the second contact part. Furthermore, the valve drive apparatus may not have the gap forming portion. In such a case, the first contact part and the second contact part can contact with teach other, and the gap between the first contact part and the second contact part cannot be adjusted. However, the first valve can be driven within a predetermined range by the actuator while the second valve is held in the fully closed state with the urging force of the urging device.

Furthermore, in the first to eighth embodiments, the actuator is not limited to the electric actuator as long as the output shaft of the actuator is movable in the axial direction. For instance, the actuator may be an actuator, which is driven by a pneumatic pressure, a hydraulic pressure or any other drive fore.

In a modification of the ninth to eleventh embodiments, the rotational range of the first drive lever may not include the rotational position where the first straight line and the second straight line overlap with each other along the common straight line.

Furthermore, in another modification of the ninth to eleventh embodiments, the second drive lever and the second valve lever may be formed such that the second predetermined distance is equal to or larger than the fourth predetermined distance.

Furthermore, in another modification of the ninth to eleventh embodiments, the first drive lever and the first valve lever may be formed such that the first predetermined distance is smaller than the third predetermined distance. In such a case, the torque of the output shaft (the first drive lever) can be amplified and can be transmitted to the first valve lever (the first valve). Furthermore, the first drive lever and the first valve lever may be formed such that the first predetermined distance is larger than the third predetermined distance.

Furthermore, in another modification of the ninth to eleventh embodiments, the second drive lever, the second rod, and the second valve lever may be arranged to satisfy the following condition upon placement of the second valve in the fully closed state: the angle between the third straight line and the fourth straight line is the right angle. Furthermore, the second drive lever, the second rod, and the second valve lever may be arranged to satisfy the following condition upon placement of the second valve in the fully closed state: the angle between the fifth straight line and the fourth straight line is an acute angle or an obtuse angle.

Furthermore, in another modification of the ninth to eleventh embodiments, the first drive lever, the first rod, and the first valve lever may be arranged to satisfy all of the following conditions upon placement of the first valve in the fully closed state: the angle between the first straight line and the second straight line is the acute angle or the obtuse angle; and the angle between the sixth straight line and the second straight line is the right angle. Furthermore, the first drive lever, the first rod, and the first valve lever may be arranged to satisfy the following condition upon placement of the first valve in the fully closed state: the angle between the sixth straight line and the second straight line is an acute angle or an obtuse angle.

Also, in another modification of the ninth to eleventh embodiments, the gap forming portion may be formed in the first predetermined shape portion. Furthermore, the valve drive apparatus may not have the gap forming portion. In such a case, the first predetermined shape portion and the second predetermined shape portion can contact with each other, and the gap between the first predetermined shape portion and the second predetermined shape portion cannot be adjusted. However, the first valve can be driven within a predetermined range by the actuator while the second valve is held in the fully closed state with the urging force of the urging device.

Also, in another modification of the ninth to eleventh embodiments, the second predetermined shape portion may be formed by bending the member, which forms the second drive lever. Furthermore, each of the first predetermined shape portion and the second predetermined shape portion may not be formed by the bending (press forming process) of the member, which forms the first drive lever or the second drive lever. For instance, the first predetermined shape portion and the second predetermined shape portion may be formed through a cutting process or a metal casting process.

Furthermore, in another modification of the ninth to eleventh embodiments, the actuator may not have the gear member, which is connected to the output shaft. That is, the output shaft and the motor may be directly connected with each other. Furthermore, the actuator is not limited to the electric actuator as long as the output shaft of the actuator is rotated about the axis of the output shaft. For instance, the actuator may be an actuator, which is driven by a pneumatic pressure, a hydraulic pressure or any other drive fore.

Furthermore, in another modification of the ninth to eleventh embodiments, the gap forming portion may be placed in the first predetermined shape portion instead of the second predetermined shape portion.

The component(s) of one or more of the above embodiments may combined with the component(s) of any other one or more of the above embodiments within the principle of the present disclosure. For instance, the valve drive apparatus of any one of the ninth to eleventh embodiments may be used as the valve drive apparatus of the supercharger of any one of the sixth to eight embodiments. Even with this modification, the advantages discussed in the corresponding one of the sixth to eighth embodiments can be achieved.

As discussed above, the present disclosure is not limited to the above embodiments, and the above embodiments may be modified within the spirit and scope of the present disclosure.

What is claimed is:

1. A valve drive apparatus installed to a supercharger that includes a first valve, which is rotatable about an axis of a first valve shaft, and a second valve, which is rotatable about an axis of a second valve shaft, the valve drive apparatus being configured to drive the first valve and the second valve, the valve drive apparatus comprising:
   an actuator that includes an output shaft, which is movable in an axial direction of the output shaft;
   a shaft portion that is connected to the output shaft and extends in the axial direction of the output shaft, wherein the shaft portion is driven by the output shaft;
   a first member that is placed along an axis of the shaft portion and includes a first contact part and a first engaging part;
   a second member that is placed along the axis of the shaft portion and includes a second contact part and a second engaging part, wherein the second contact part is contactable with the first contact part;
   a first valve lever that includes a first valve lever shaft, which is rotatable integrally with the first valve shaft, wherein an axis of the first valve lever shaft is parallel to the axis of the first valve shaft and is placed at a location that is spaced from the axis of the first valve shaft by a first predetermined distance;
   a second valve lever that includes a second valve lever shaft, which is rotatable integrally with the second valve shaft, wherein an axis of the second valve lever shaft is parallel to the axis of the second valve shaft and is placed at a location that is spaced from the axis of the second valve shaft by a second predetermined distance;
   a first rod that is rotatably connected to the first valve lever shaft at one end part of the first rod and is connected to the shaft portion or the first member at another end part of the first rod, which is opposite from the one end part of the first rod;
   a second rod that is rotatably connected to the second valve lever shaft at one end part of the second rod and is connected to the second member at another end part of the second rod, which is opposite from the one end part of the second rod; and
   an urging device that is placed between the first engaging part and the second engaging part and urges the first member and the second member to urge the first contact part and the second contact part toward each other.

2. The valve drive apparatus according to claim 1, wherein:
   the valve drive apparatus is installed to the supercharger that includes:
   a compressor that is installed in an intake passage, which guides intake air to an internal combustion engine;
   a turbine that is installed in an exhaust passage, which conducts exhaust gas outputted from the internal combustion engine, wherein the turbine rotates the compressor when the turbine is rotated upon supply of the exhaust gas to the turbine;
   the first valve that is installed in an exhaust flow path, which guides the exhaust gas from the internal combustion engine to the turbine, wherein the first valve opens or closes the exhaust flow path through rotation of the first valve about the axis of the first valve shaft; and
   the second valve that is installed in a bypass flow path that connects between one side of the turbine, at which the internal combustion engine is located, and an opposite side of the turbine, which is opposite from the internal combustion engine, in the exhaust passage, while the bypass flow path bypasses the turbine, wherein the second valve opens or closes the bypass flow path through rotation of the second valve about the axis of the second valve shaft; and
   the valve drive apparatus opens or closes the first valve and the second valve.

3. The valve drive apparatus according to claim 1, wherein:
   the valve drive apparatus is installed to the supercharger that includes:
   a first compressor and a second compressor that are installed in an intake passage, which guides intake air to an internal combustion engine;
   a first turbine that is installed in an exhaust passage, which conducts exhaust gas outputted from the internal combustion engine, wherein the first turbine rotates the first compressor when the first turbine is rotated upon supply of the exhaust gas to the first turbine;

a second turbine that is installed in the exhaust passage, wherein the second turbine rotates the second compressor when the second turbine is rotated upon supply of the exhaust gas to the second turbine;

the first valve that is installed in one of a first exhaust flow path, which guides the exhaust gas from the internal combustion engine to the first turbine, and a second exhaust flow path, which guides the exhaust gas from the internal combustion engine to the second turbine, wherein the first valve opens or closes the one of the first exhaust flow path and the second exhaust flow path through rotation of the first valve about the axis of the first valve shaft; and the second valve that is installed in a bypass flow path that connects between one side of the first turbine and the second turbine, at which the internal combustion engine is located, and an opposite side of the first turbine and the second turbine, which is opposite from the internal combustion engine, in the exhaust passage, while the bypass flow path bypasses the first turbine and the second turbine, wherein the second valve opens or closes the bypass flow path through rotation of the second valve about the axis of the second valve shaft; and the valve drive apparatus opens or closes the first valve and the second valve.

4. The valve drive apparatus according to claim 1, wherein:

the urging device is made of a resilient member, which has a predetermined modulus of elasticity;

one end part of the urging device is engaged with the first engaging part; and another end part of the urging device, which is opposite from the one end part of the urging device, is engaged with the second engaging part.

5. The valve drive apparatus according to claim 1, wherein:

the shaft portion is formed coaxially and integrally with the output shaft;

the first member is formed integrally with the shaft portion;

the second member is movable relative to the shaft portion; and the first rod is connected to the shaft portion at the another end part of the first rod.

6. The valve drive apparatus according to claim 5, wherein:

the first member includes an upper member, at which the first engaging part is formed, and a lower member, at which the first contact part is formed; and the second member is placed between the upper member and the lower member.

7. The valve drive apparatus according to claim 1, wherein:

the first member includes a first tubular portion, which is coaxial with the shaft portion; and the second member includes a second tubular portion, which is placed on an outer side or an inner side of the first tubular portion.

8. The valve drive apparatus according to claim 1, further comprising a gap forming portion, which is formed in and projects from one of the first contact part and the second contact part toward the other one of the first contact part and the second contact part and forms a predetermined gap between the first contact part and the second contact part when the gap forming portion contacts the other one of the first contact part and the second contact part, wherein an amount of projection of the gap forming portion from the one of the first contact part and the second contact part is variable.

9. The valve drive apparatus according to claim 1, wherein when an electric power is supplied to the actuator, the actuator axially drives the output shaft.

10. A supercharger comprising:

a compressor that is installed in an intake passage, which guides intake air to an internal combustion engine;

a turbine that is installed in an exhaust passage, which conducts exhaust gas outputted from the internal combustion engine, wherein the turbine rotates the compressor when the turbine is rotated upon supply of the exhaust gas to the turbine;

a first valve that is installed in an exhaust flow path, which guides the exhaust gas from the internal combustion engine to the turbine, wherein the first valve opens or closes the exhaust flow path through rotation of the first valve about an axis of a first valve shaft;

a second valve that is installed in a bypass flow path that connects between one side of the turbine, at which the internal combustion engine is located, and an opposite side of the turbine, which is opposite from the internal combustion engine, in the exhaust passage, while the bypass flow path bypasses the turbine, wherein the second valve opens or closes the bypass flow path through rotation of the second valve about an axis of a second valve shaft; and the valve drive apparatus of claim 1, wherein the first valve lever is rotatable integrally with the first valve shaft to drive the first valve, and the second valve lever is rotatable integrally with the second valve shaft to drive the second valve.

11. A supercharger comprising:

a first compressor and a second compressor that are installed in an intake passage, which guides intake air to an internal combustion engine;

a first turbine that is installed in an exhaust passage, which conducts exhaust gas outputted from the internal combustion engine, wherein the first turbine rotates the first compressor when the first turbine is rotated upon supply of the exhaust gas to the first turbine;

a second turbine that is installed in the exhaust passage, wherein the second turbine rotates the second compressor when the second turbine is rotated upon supply of the exhaust gas to the second turbine;

a first valve that is installed in one of a first exhaust flow path, which guides the exhaust gas from the internal combustion engine to the first turbine, and a second exhaust flow path, which guides the exhaust gas from the internal combustion engine to the second turbine, wherein the first valve opens or closes the one of the first exhaust flow path and the second exhaust flow path through rotation of the first valve about an axis of a first valve shaft;

a second valve that is installed in a bypass flow path that connects between one side of the first turbine and the second turbine, at which the internal combustion engine is located, and an opposite side of the first turbine and the second turbine, which is opposite from the internal combustion engine, in the exhaust passage, while the bypass flow path bypasses the first turbine and the second turbine, wherein the second valve opens or closes the bypass flow path through rotation of the second valve about an axis of a second valve shaft; and the valve drive apparatus of claim 1, wherein the first valve lever is rotatable integrally with the first valve shaft to drive the first valve, and the second valve lever is rotatable integrally with the second valve shaft to drive the second valve.

12. A valve drive apparatus installed to a supercharger that includes a first valve, which is rotatable about an axis of a first valve shaft, and a second valve, which is rotatable about an axis of a second valve shaft, the valve drive apparatus being configured to drive the first valve and the second valve, the valve drive apparatus comprising:
- an actuator that includes an output shaft, which is movable in an axial direction of the output shaft;
- a shaft portion;
- a first member that is placed along an axis of the shaft portion and includes a first contact part and a first engaging part;
- a second member that is placed along the axis of the shaft portion and includes a second contact part and a second engaging part, wherein the second contact part is contactable with the first contact part;
- a first valve lever that includes a first valve lever shaft, which is rotatable integrally with the first valve shaft, wherein an axis of the first valve lever shaft is parallel to the axis of the first valve shaft and is placed at a location that is spaced from the axis of the first valve shaft by a first predetermined distance;
- a second valve lever that includes a second valve lever shaft, which is rotatable integrally with the second valve shaft, wherein an axis of the second valve lever shaft is parallel to the axis of the second valve shaft and is placed at a location that is spaced from the axis of the second valve shaft by a second predetermined distance;
- a first rod that is rotatably connected to the first valve lever shaft at one end part of the first rod and is connected to the shaft portion or the first member at another end part of the first rod, which is opposite from the one end part of the first rod;
- a second rod that is rotatably connected to the second valve lever shaft at one end part of the second rod and is connected to the second member at another end part of the second rod, which is opposite from the one end part of the second rod;
- an urging device that is placed between the first engaging part and the second engaging part and urges the first member and the second member to urge the first contact part and the second contact part toward each other; and
- a gap forming portion, which is formed in and projects from one of the first contact part and the second contact part toward the other one of the first contact part and the second contact part and forms a predetermined gap between the first contact part and the second contact part when the gap forming portion contacts the other one of the first contact part and the second contact part, wherein an amount of projection of the gap forming portion from the one of the first contact part and the second contact part is variable.

* * * * *